United States Patent
Amuru et al.

(10) Patent No.: US 11,265,911 B2
(45) Date of Patent: *Mar. 1, 2022

(54) METHODS FOR PERFORMING MULTI-SUBFRAME SCHEDULING IN ENHANCED LAA

(71) Applicant: Samsung Electronics Co., Ltd., Suwon-si (KR)

(72) Inventors: Saidhiraj Amuru, Bangalore (IN); Anshuman Nigam, Bangalore (IN); Pravjyot Singh Deogun, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/843,390

(22) Filed: Apr. 8, 2020

(65) Prior Publication Data

US 2020/0236703 A1 Jul. 23, 2020

Related U.S. Application Data

(63) Continuation of application No. 15/476,467, filed on Mar. 31, 2017, now Pat. No. 10,721,762.

(30) Foreign Application Priority Data

Mar. 31, 2016 (IN) .............................. 201641011493
Mar. 21, 2017 (IN) .............................. 2016 41011493

(51) Int. Cl.
*H04W 72/14* (2009.01)
*H04W 72/04* (2009.01)
*H04W 74/08* (2009.01)

(52) U.S. Cl.
CPC ....... *H04W 72/14* (2013.01); *H04W 72/0446* (2013.01); *H04W 74/0808* (2013.01)

(58) Field of Classification Search
CPC ............. H04W 72/14; H04W 72/0446; H04W 74/0808
See application file for complete search history.

(56) References Cited

U.S. PATENT DOCUMENTS 9,344,259 B2 * 5/2016 Love ...................... H04L 5/003
9,538,518 B2 * 1/2017 Seo ..................... H04W 72/042
(Continued)

FOREIGN PATENT DOCUMENTS

WO  2016/006890 A1  1/2016
WO  2016/010354 A1  1/2016
(Continued)

OTHER PUBLICATIONS

3GPP TSG RAN WG1 Meeting #86, Gothenburg, Sweden, Aug. 22-26, 2016, Ericsson, Huawei, R1-168210 RAN1 Agreements, Working Assumptions and Conclusions for Rel-14 Enhanced LAA, Aug. 22-26, 2016.
(Continued)

*Primary Examiner* — Rasheed Gidado
(74) *Attorney, Agent, or Firm* — Jefferson IP Law, LLP

(57) ABSTRACT

A method which allows an evolved node B (eNB) to perform multi-subframe scheduling in enhanced license assisted access (eLAA) is provided. The eNB determining the subframes in a maximum channel occupancy time (MCOT) within which uplink transmission is performed. The eNB schedules resources for uplink transmission by user equipments (UEs) within the determined subframes. The UEs receive index values associated with a first subframe and a last subframe, in the determined subframes from the eNB. The first subframe and last subframe may be within a single, or multiple MCOTs. The UEs perform uplink transmission between the first subframe and the last subframe. The method allows forming a group with the plurality of UEs. A group identity, broadcast by the eNB, is received by the UEs.
(Continued)

The method allows scheduling beams for performing uplink transmission by the UEs in 5$^{th}$ generation (5G) systems and scheduling multiple UEs while accounting spectral emissions.

20 Claims, 28 Drawing Sheets

(56) References Cited

U.S. PATENT DOCUMENTS

| | | | |
|---|---|---|---|
| 9,794,960 | B2 | 10/2017 | Ng |
| 10,271,325 | B2 | 4/2019 | Mukherjee et al. |
| 10,292,182 | B2 * | 5/2019 | Yang ................. H04W 74/0816 |
| 10,368,372 | B2 | 6/2019 | Chendamarai Kannan et al. |
| 10,361,809 | B2 | 7/2019 | Dinan |
| 10,536,973 | B2 * | 1/2020 | Yang ....................... H04L 27/26 |
| 2015/0264708 | A1 * | 9/2015 | Li .......................... H04L 5/0055 370/329 |
| 2016/0278050 | A1 | 9/2016 | Nory et al. |
| 2016/0360553 | A1 | 12/2016 | Cheng et al. |
| 2017/0201308 | A1 | 7/2017 | Park et al. |
| 2017/0208588 | A1 | 7/2017 | Park et al. |
| 2017/0215157 | A1 | 7/2017 | Yang et al. |
| 2017/0238334 | A1 | 8/2017 | Yang et al. |
| 2017/0238342 | A1 | 8/2017 | Yang et al. |
| 2017/0273056 | A1 | 9/2017 | Papasakellariou |
| 2017/0280430 | A1 | 9/2017 | Yin et al. |
| 2017/0280475 | A1 | 9/2017 | Yerramalli et al. |
| 2017/0289869 | A1 | 10/2017 | Nogami et al. |
| 2018/0242360 | A1 * | 8/2018 | Noh ....................... H04L 1/1812 |
| 2018/0302795 | A1 * | 10/2018 | Harada .............. H04W 72/0453 |
| 2019/0150170 | A1 | 5/2019 | Park et al. |

FOREIGN PATENT DOCUMENTS

| | | |
|---|---|---|
| WO | 2016/021954 A1 | 2/2016 |
| WO | 2016/029132 A1 | 2/2016 |

OTHER PUBLICATIONS

Huawei et al.; Analysis on LBT with category 2 and 4 for eLAA; 3GPP TSG RAN WG1 Meeting #84; R1-160297; Feb. 15-19, 2016; St. Julian's, Malta.

Intel Corporation; Introduction of cross-burst scheduling; 3GPP TSG RAN WG1 Meeting #84; R1-160427; Feb. 15-19, 2016; St. Julian's, Malta.

Broadcom Limited; Discussion on LAA UL LBT Design; 3GPP TSG-RAN WG1 Meeting #84; R1-160817; Feb. 15-19, 2016; Malta.

Indian Office Action dated Mar. 13, 2020; Indian Appln. No. 201641011493.

* cited by examiner

FIG. 13B

Long LBT

| MCOT 1 | n | UE1 or UE2 | UE1 or UE2 | UE1 or UE2 | UE1 or UE2 | UE1 or UE2 | UE1 or UE2 |

FIG. 13C

Long LBT

| | UE1 or UE2 | UE1 or UE2 | n+2 | UE1 or UE2 | UE1 or UE2 | UE1 or UE2 | UE1 or UE2 |
|---|---|---|---|---|---|---|---|
| MCOT m | | | k2 | | | | |

METHODS FOR PERFORMING MULTI-SUBFRAME SCHEDULING IN ENHANCED LAA

CROSS-REFERENCE TO RELATED APPLICATION(S)

This application is a continuation application of prior application Ser. No. 15/476,467, filed on Mar. 31, 2017, which claimed priority under 35 U.S.C. § 119(a) of an Indian provisional patent application filed on Mar. 31, 2016 in the Indian Patent Office and assigned Serial number 201641011493, and of an Indian non-provisional patent application filed on Mar. 21, 2017 in the Indian Patent Office and assigned Serial number 201641011493, the entire disclosure of each of which is hereby incorporated by reference.

TECHNICAL FIELD

The present disclosure relates to long term evolution-unlicensed (LTE-U) systems. More particularly, the present disclosure relates to methods for performing multi-user equipment (UE) scheduling in an enhanced license assisted access (eLAA).

BACKGROUND

Unlicensed spectrum is available for usage by any technology such as Bluetooth, Wi-Fi, or the like, unlike the licensed band operation where explicit licenses must be obtained for supporting transmissions. The current unlicensed bands include 2.4 GHz, 3.5 GHz, 5 GHz, and 60 GHz. The existing methods propose deployment of long term evolution (LTE) in the unlicensed 5 GHz spectrum while addressing the co-existence with Wi-Fi nodes. There are requirements for considering the co-existence of 5$^{th}$ generation (5G) technology in the unlicensed bands. The next generation radio access technologies (RAT) has to support efficient mechanisms for sharing the unlicensed spectrum with other international mobile telecommunications (IMT)/non-IMT systems. As such, it is necessary to mitigate issues which can hamper the co-, existence of LTE with Wi-Fi.

LTE-unlicensed (LTE-U) is the technology, where LTE co-exists with Wi-Fi nodes in the 5 GHz unlicensed spectrum. The standards for the LTE-U in a downlink have been finalized in the Release-13. In Release-14, work related to uplink transmission in the LTE-U spectrum initiated. The LTE-U is having two variants, viz., LTE-U and licensed assisted access (LAA). The LTE-U relies on a carrier sense adaptive transmission, in which there is a discontinuous transmission for coexistence with the Wi-Fi nodes. In the LAA, a dedicated primary cell (P-Cell) exists in a licensed band that can coordinate some of the actions in the unlicensed spectrum.

5G is touted as the next big-thing in wireless industry. 3$^{rd}$ generation partnership project (3GPP) has started specification studies for 5G systems. One of the two key distinctions to be considered for the study of 5G systems is frequency of operation. Specifically, studies consider either the portion of the unlicensed spectrum which is less than 6 GHz or the portion of the unlicensed spectrum which is greater than 6 GHz. For 5G systems operating in the portion of the unlicensed spectrum, less than 6 GHz, and co-existing with other nodes (Wi-Fi) in the unlicensed spectrum, follow the design principles of the LAA and enhanced LAA (eLAA) technologies. However, this is not the case for 5G systems which operate in the portion of the unlicensed spectrum which is greater than 6 GHz. In this spectrum beamforming is the primary technology enabler. Hence, appropriate techniques that suit this primary technology enabler have to be investigated.

Energy detection is proposed as the enabling mechanism to be utilized for channel sensing in LTE-U technology. Since energy detection is the most widely used method for spectrum sensing, it can be used in 5G systems in the unlicensed bands. When, a node, i.e., either a user equipment (UE) or evolved node B (eNB), senses the channel for some period of time (sensing mechanism is completely defined by the listen before talk (LBT) procedures) and if the energy levels are below a predefined threshold, then the node declares that the channel is free and thereafter proceeds with its transmissions. While the LBT procedures are defined with respect to the LTE technology, similar procedures will be developed for 5G systems as part of the 5G specifications.

The simple sensing techniques such as energy detection are prone to errors due to adjacent channel leakage. In an example, if a first UE (UE 1) is occupying channel 1 and a second UE (UE 2) is occupying channel 2. Prior to performing uplink transmission, the UE 2 intends to sense whether or not the channel 2 (which is adjacent to channel 1) is free. In order to perform the sensing procedure, the UE 2 performs energy detection. The UE 2 may, or may not, determine that the channel 2 is free. The cause of not being able to determine that the channel 2 is free, is primarily due to the leakage (spectral emission) across channel 1 and channel 2, due to interference from the transmissions of UE 1. It can be depicted through experimental studies that the leakage can be as high as 15 dB, which can prevent (depending on the power levels at which UE 1 is transmitting on channel 1) channel 2 to be used by the UE 2 for performing uplink transmissions, although there are no Wi-Fi nodes operating in the spectrum of the channel 2.

Therefore it is necessary to address the issue of spectral emission when the eNB intends to schedule multiple UE's across various channels in the unlicensed spectrum. Furthermore, the different unlicensed carriers to be used by the eNB for scheduling uplink transmissions by multiple UEs are synchronized in time. Spectral emission also leads to complications in scheduling multiple UEs in adjacent frequency bands of the unlicensed spectrum.

In 5G systems, with beamforming capabilities (specifically in the 6 GHz spectrum), multiple UEs are scheduled across beams. There are circumstances, wherein the different beams allocated to different UEs are not sufficiently separated spatially. Spectral emission occurs across beams either due to overlap of the different beams and side lobes, and various other spectral emission mechanisms.

Thus, there is a need of having a method which allows efficient radio resource utilization by a single or a plurality of UEs in the LTE-U systems.

There is also a need of having a method for enhancing the performance of the LTE systems and 5G systems in LTE-U systems.

The above information is presented as background information only to assist with an understanding of the present disclosure. No determination has been made and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods for performing multi-user equipment (UE) scheduling in enhanced license assisted access (eLAA).

Another aspect of the embodiments herein is to allow efficient radio resource utilization by a single UE or a plurality of UEs in the long term evolution-unlicensed (LTE-U) systems.

Another aspect of the present disclosure is to schedule radio resources for multiple UEs across multiple subframes in LTE-U, while accounting for the uncertainty in channel sensing mechanisms.

Another aspect of the present disclosure is to allow slot-level and symbol-level scheduling of radio resources for uplink transmission by multiple UEs.

Another aspect of the present disclosure is to provide a method of scheduling multiple subframes that accounts interference map at any node (UE or evolved node B (eNB)) in LTE-U systems.

Another aspect of the present disclosure is to provide signaling mechanisms in the eNB for controlling the operations in LTE-U which facilitate fair co-existence of different radio access technologies (RAT) in the LTE-U.

Another aspect of the present disclosure is to allocate dedicated spectral resources in the LTE-U spectrum to different UEs, in which the allocated spectral resources to the different UEs are adjacent.

Another aspect of the present disclosure is to provide adjacent beams, in a beamforming-based system, while accounting for the impairments causing inefficient spectrum sensing and prevent degradation of the system performance in the LTE-U spectrum.

In accordance with an aspect of the present disclosure, a method implemented in an evolved node B (eNB) for performing multi-subframe scheduling in enhanced license assisted access (eLAA) is provided. The method includes allocating a grant in a subframe within a maximum channel occupancy time (MCOT). The method includes determining a first subframe and a last subframe within the MCOT. A predefined delay exists between the subframe with the allocated grant and the first subframe. The method includes scheduling resources for uplink transmission by a UE from the first subframe to the last subframe.

In an embodiment, the method includes determining MCOT values of the UE and the eNB. The method includes determining an index value of the first subframe and an index value of the last subframe based on the determined MCOT values of the UE and the eNB.

In an embodiment, the method includes determining a probability of interference at the UE and the probability of interference at the eNB. The method includes assigning a predefined index value for the first subframe. The method includes determining an index value of the last subframe based on the determined probabilities of the interferences at the UE, the eNB, and the predefined index value assigned to the first subframe.

In accordance with another aspect of the present disclosure, a method implemented in a UE for performing uplink transmission in eLAA is provided. The method includes receiving an index value associated with the first subframe and the index value associated with a last subframe, from the eNB. The first subframe and last subframe are within a single MCOT. The method includes performing uplink transmission between the first subframe and the last subframe.

In an embodiment, the method includes performing a listen before talk (LBT) procedure for a predefined period prior to initiating the uplink transmission from the first subframe. The method includes determining whether the LBT procedure is successful.

In an embodiment, the method includes initiating the uplink transmission from the first subframe in response to determining that the LBT procedure is successful. The method includes suspending to initiate the uplink transmission for a subframe period, corresponding to a time period of a subframe in the MCOT, in response to determining that the LBT procedure is failed. The method includes performing the LBT procedure for the predefined period. The LBT procedure is performed prior to initiating the uplink transmission from a second subframe. The second subframe is subsequent to the first subframe. The method includes initiating the uplink transmission from the second subframe, in response to determining that the LBT procedure is successful.

In accordance with another aspect of the present disclosure, a method implemented in the eNB for performing multi-subframe scheduling for a plurality of UEs in eLAA is provided. The method includes forming a group with the plurality of UEs. The association of each UE with the group is based on information corresponding to at least one signaling parameter. The method includes determining absence of interference in the proximity to the eNB through the LBT procedure. The method includes scheduling subframes for uplink transmission within a first subframe and a last subframe. The first subframe and the last subframe are either associated with one MCOT, or the first subframe and the last subframe are associated with multiple MCOTs.

In an embodiment, the method includes determining a received signal strength indicator (RSSI) value from each UE associated with the group. Based on the RSSI values, the UEs are temporarily associated with the group. Thereafter, the method includes determining global positioning system (GPS) information, angle of arrival (AoA) information, direction of arrival (DoA) information, or the like, in response to determining that the RSSI values of the temporarily associated UEs exceeds a predefined threshold. The method includes associating each UE in the group in accordance with GPS information, the AoA information, and the DoA information.

In an embodiment, the method includes determining the index values of the first subframe and the last subframe. The method includes allocating priority to each UE associated with the group, for uplink transmission. The method includes broadcasting the allocated priority to the UEs, associated with the group, based on a group radio network temporary identifier (RNTI), and RNTI of each UE.

In an embodiment, the index values of the first subframe and the last subframe is determined based on the MCOT value of each UE associated with the group and the MCOT value of the eNB.

In an embodiment, the method includes determining a probability of interference at each UE associated with the group and the probability of interference at the eNB. The method includes assigning a predefined index value for the first subframe. The method includes determining an index value of the last subframe based on the determined probabilities of interferences at the UE, the eNB, and the predefined index value assigned for the first subframe.

In an embodiment, the method includes determining the MCOT value of each UE associated with the group and the MCOT value of the eNB. The method includes receiving requirement for radio resources, for the uplink transmission, from each UE, and a LBT status of each UE, associated with the group. The method includes determining the index values of the first subframe and the last subframe based on the determined MCOT values of each UE associated with the group, the eNB, the requirement of radio resource, and the LBT status of each UE.

In an embodiment, the method includes determining that the first subframe and the last subframe are either within a single MCOT or within multiple MCOTs, based on the difference between determined index values of the first subframe and the last subframe.

In accordance with another aspect of the present disclosure, a method, implemented in a UE associated with the group, for performing uplink transmission in eLAA is provided. The method includes determining an identity of the group. The method includes determining priority of uplink transmission allocated by the eNB. The method includes receiving the index values of the first subframe and the last subframe. The first subframe and last subframe are either within one MCOT, or the first subframe and last subframe are within multiple MCOTs. The method includes performing uplink transmission within the first subframe and the last subframe.

In an embodiment, the method includes performing the LBT procedure for a predefined period based on the allocated priority. The LBT procedure is performed prior to initiating the uplink transmission from the first subframe. The method includes initiating the uplink transmission from the first subframe in response to determining that the LBT procedure is successful.

In an embodiment, the method includes suspending to initiate the uplink transmission for a subframe period corresponding to a time period of a subframe in the MCOT, in response to determining that the LBT procedure has failed. The method includes performing the LBT procedure for the predefined period based on the allocated priority. The LBT procedure is performed prior to initiate the uplink transmission from the second subframe. The method includes initiating the uplink transmission from the second subframe in response to determining that the LBT procedure is successful.

In an embodiment, the method includes suspending to initiate the uplink transmission for a slot period in the subframe, in response to determining that the LBT procedure has failed. The slot period is the period of a slot in the first subframe. The method includes performing the LBT procedure for the predefined period based on the allocated priority. The LBT procedure is performed prior to initiate the uplink transmission from a second slot in the first subframe. The method includes initiating the uplink transmission from the second slot in response to determining that the LBT procedure is successful.

In an embodiment, the method includes suspending to initiate the uplink transmission for a symbol period in the subframe, in response to determining that the LBT procedure has failed. The symbol period is the period of a symbol in the first subframe. The method includes performing the LBT procedure for the predefined period based on the assigned priority. The LBT procedure is performed prior to transmitting information from the second symbol in the first subframe. The method includes initiating the uplink transmission from the second symbol in response to determining that the LBT procedure is successful.

In an embodiment, initiating uplink transmission by a UE associated with the group comprises performing a LBT procedure prior to initiating uplink transmission in one of a subframe, a slot in the subframe, and a symbol, in the subframe of a second MCOT, wherein the first subframe is located in the first MCOT and the last subframe are not within a single MCOT.

In an embodiment, initiating uplink transmission by a UE associated with the group comprises performing a LBT procedure prior to initiating uplink transmission in either of: a subframe, a slot in the subframe, and a symbol, in the subframe of a second MCOT, in which the first subframe is located in the first MCOT and the last subframe is located in the second MCOT.

In accordance with another aspect of the present disclosure, a method implemented in the eNB for scheduling UEs in eLAA is provided. The method includes determining an absence of interference in the proximity of the eNB through performing the LBT procedure. The method includes allocating dedicated spectral resources for uplink transmission by a first UE and a second UE. The uplink transmissions of the first UE and the second UE are synchronized in time.

In an embodiment, the method includes determining a category of the LBT procedure to be performed by the first UE and the second UE, based on an interference report received from the first UE and the second UE. The method includes assigning a contention window (CW) to the first UE and the second UE based on the category of the determined LBT procedure.

In an embodiment, the method includes suspending for a predefined period post expiry of a time period required to perform a LBT procedure by the first UE and the second UE. The method includes detecting either an absence or an occurrence of simultaneous uplink transmissions, from the first UE and the second UE. The method includes determining that the LBT procedure performed by the first UE and the second UE is successful, in response to detecting the occurrence of simultaneous uplink transmissions.

In an embodiment, the method includes determining that the LBT procedure performed by the first UE has failed, in response to detecting the absence of simultaneous uplink transmissions from the first UE and the second UE. The method includes transmitting a signal to the second UE to terminate the uplink transmission post detecting an absence of uplink transmission from the first UE. Similarly, the method includes determining that the LBT procedure performed by the second UE has failed, in response to detecting the absence of simultaneous uplink transmissions from the first UE and the second UE. The method includes transmitting a signal to the first UE to terminate the uplink transmission post detecting an absence of uplink transmission from the second UE. Thereafter, the method allows simultaneous uplink transmissions post determining that the LBT procedure performed by the second UE or the first UE is successful. The method includes determining that the LBT procedure performed by the second UE if the eNB fails to detect uplink transmissions from the second UE. The method includes determining that the LBT procedure performed by the first UE if the eNB fails to detect uplink transmissions from the first UE.

In an embodiment, the method includes detecting an emission of the spectral resource allocated to the first UE in the spectral resource allocated to the second UE. The method includes determining a portion of the spectral resource allocated to the second UE which is not impacted by the emission of the spectral resource allocated to the first UE. The method allows uplink transmission by the second UE in the determined portion of the spectral resource allocated to the second UE.

In an embodiment, the method includes detecting an emission of the spectral resource allocated to the first UE on the spectral resource allocated to the second UE. The method includes determining a portion of the spectral resource allocated to the second UE which is impacted by the emission of the spectral resource allocated to the first UE. The method allows uplink transmission by the first UE in the spectral resource allocated to the first UE, excluding a portion, which is equal to the determined portion of the spectral resource allocated to the second UE, adjacent to the spectral resource allocated to the second UE.

In an embodiment, the method includes ensuring that transmitted power of the first UE and the second UE is below a predefined threshold. This minimizes the false detection of channel occupancy.

In an embodiment, the method includes segmenting the spectral resource allocated to both the first UE and the second UE, is segmented into a first portion, a second portion, and a third portion. The first portion and the second portion are adjacent and the second portion and the third portion are adjacent.

In an embodiment, the method includes determining whether proximity of the first UE and the second UE is below a predefined threshold. The method includes allocating the first portion for uplink transmission by the first UE and the third portion for uplink transmission by the second UE, in response to determining that proximity of the first UE and the second UE is below the predefined threshold. The method includes allocating the first portion for uplink transmission by the first UE and the second portion for uplink transmission by the second UE, in response to determining that proximity of the first UE and the second UE exceeds the predefined threshold.

In accordance with another aspect of the present disclosure, a method for scheduling beams for performing uplink transmission by the UEs in 5G systems is provided. The method includes determining a first beam among a plurality of beams for uplink transmission by a first UE. The method includes determining a second beam among a plurality of beams for uplink transmission by a second UE. The method includes determining whether spatial proximity of the first beam and the second beam is below a predefined threshold. The method includes suspending uplink transmissions from the first UE and the second UE, in response to determining that the spatial proximity of the first beam and the second beam is below the predefined threshold. The method includes receiving simultaneous uplink transmissions from the first UE and the second UE, in response to determining that the spatial proximity of the first beam and the second beam exceeds the predefined threshold.

Other aspects, advantages, and salient features of the disclosure will become apparent to those skilled in the art from the following detailed description which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 13A, 13B, and 13C illustrate scheduling of subframes for performing uplink transmission across multiple maximum channel occupancy time (MCOTs) according to various embodiments of the present disclosure;

Throughout the drawings, it should be noted that like reference numbers are used to depict the same or similar elements, features, and structures.

DETAILED DESCRIPTION

Figure 1:
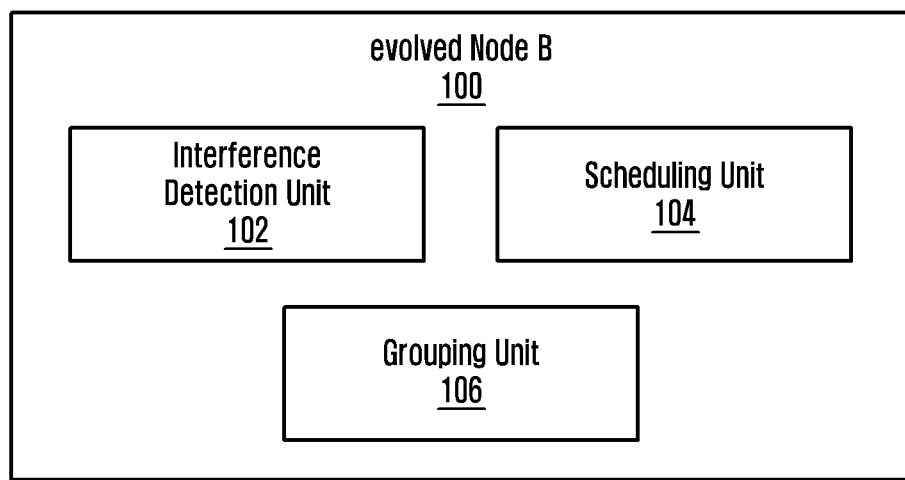
FIG. 1 depicts the various units of an evolved node B (eNB) implementing a method for performing multi-subframe scheduling for user equipments (UEs) in enhanced license assisted access (eLAA) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Accordingly embodiments herein provide a method, implemented in an evolved node B (eNB), for performing multi-subframe scheduling in an enhanced license assisted access (eLAA). The method includes allocating a grant in a subframe within a maximum channel occupancy time (MCOT). The method includes determining a first subframe and a last subframe within the MCOT. A predefined delay exists between the subframe with the allocated grant and the first subframe. The method includes scheduling resources for uplink transmission by a user equipment (UE) from the first subframe to the last subframe.

Accordingly embodiments herein provide a method, implemented in a UE, for performing uplink transmission in eLAA. The method includes receiving an index value associated with the first subframe and the index value associated with a last subframe, from the eNB. The first subframe and last subframe are within a single MCOT. The method includes performing uplink transmission between the first subframe and the last subframe.

Accordingly embodiments herein provide a method, implemented in the eNB, for performing multi-subframe scheduling for a plurality of UEs in eLAA. The method includes forming a group with the plurality of UEs. The association of each UE with the group is based on information corresponding to at least one signaling parameter. The method includes determining absence of interference in the proximity to the eNB through the LBT procedure. The method includes scheduling subframes for uplink transmission within a first subframe and a last subframe. The first subframe and the last subframe are either associated with one MCOT, or the first subframe and the last subframe are associated with multiple MCOTs.

Accordingly embodiments herein provide a method, implemented in a UE associated with the group, for performing uplink transmission in eLAA. The method includes determining an identity of the group. The method includes determining priority of uplink transmission allocated by the eNB. The method includes receiving the index values of the first subframe and the last subframe. The first subframe and last subframe are either within one MCOT, or the first subframe and last subframe are within multiple MCOTs. The method includes performing uplink transmission within the first subframe and the last subframe.

Accordingly embodiments herein provide a method, implemented in the eNB, for scheduling UEs in eLAA. The method includes determining an absence of interference in the proximity of the eNB through performing the LBT procedure. The method includes allocating dedicated spectral resources for uplink transmission by a first UE and a second UE. The uplink transmissions of the first UE and the second UE are synchronized in time.

Accordingly embodiments herein provide a method for scheduling UEs for uplink transmission using beams. The method includes determining a first beam among a plurality of beams for uplink transmission by a first UE. The method includes determining a second beam among a plurality of beams for uplink transmission by a second UE. The method includes determining whether spatial proximity of the first beam and the second beam is below a predefined threshold. The method includes suspending uplink transmissions from the first UE and the second UE, in response to determining that the spatial proximity of the first beam and the second beam is below the predefined threshold. The method includes receiving simultaneous uplink transmissions from the first UE and the second UE, in response to determining that the spatial proximity of the first beam and the second beam exceeds the predefined threshold.

Unlike conventional methods, the proposed method provides a multi-UE and multi-subframe scheduling mechanism for eLAA enabled networks. The proposed method accounts for any uncertainty in interference in the unlicensed spectrum, and addresses radio resource wastage in the uplink of the eLAA systems by providing access control. The proposed method allows scheduling multiple UEs on same resources and minimizes the resource wastage in LAA networks due to uncertainty in channel sensing mechanisms. The proposed method allows scheduling multiple subframes for uplink transmission by the UEs and allows flexible uplink transmission owing to uncertainty in the LBT status of the UEs. The proposed method allows slot-level and symbol-level scheduling of radio resources for uplink transmission by multiple UEs. The proposed method provides signaling mechanisms in the eNB for controlling the operations in LTE-U which facilitate fair co-existence of different radio access technologies (RAT) in LTE-U.

The proposed method provides allocates dedicated spectral resources in the LTE-U spectrum to different UEs. The proposed method provides support for allocating spectral resources to the different UEs which are adjacent to each other. The proposed method provides adjacent beams, in a beamforming-based system, while accounting for the impairments causing inefficient spectrum sensing. The proposed method prevents degradation of the system performance in the LTE-U spectrum.

Referring now to the drawing and more particularly to FIGS. 1 through 20, where similar reference characters denote corresponding features consistently throughout the figures, there are shown preferred embodiments.

FIG. 1 depicts the various units of an eNB 100 implementing a method for performing multi-subframe scheduling for UEs in eLAA according to an embodiment of the preset disclosure.

Referring to FIG. 1, the eNB 100 includes an interference detection unit 102, a scheduling unit 104, and a grouping unit 106. The interference detection unit 102 performs a sensing procedure to detect a presence of active interference. The interference is primarily caused by Wi-Fi nodes in the unlicensed spectrum of LTE, i.e., LTE-U. Based on the result of detection, i.e., a presence or an absence of interference, the eNB 100 allocates radio resources, for performing uplink transmission, to either a single or a plurality of UEs.

Initially, the eNB 100 performs a LBT procedure for detecting the presence of interference. If the LBT procedure is successful (presence of interference not detected), then the scheduling unit 104 provides a grant to the UE/UEs, in a subframe, to perform transmission. On the other hand, if the LBT procedure fails (presence of interference is detected), then the scheduling unit 104 does not provide the grant.

Considering that the LBT procedure, performed by the eNB, 100 is successful, the scheduling unit 104 allows the UE/UEs to perform uplink transmissions from a first subframe to a last subframe. The grant, provided by the eNB 100, is valid from the first subframe to the last subframe. The first subframe and the last subframe can be either located in a same MCOT, or the first subframe and the last subframe can be located in different MCOTs. The first subframe and the last subframe are having index values, which are determined by the scheduling unit 104. Based on the index values of the first subframe and the last subframe, the UE/UEs, can determine whether the first subframe and the last subframe are located in the same MCOT or different MCOTs. The determination of, whether or not, the first subframe and the last subframe are located in same MCOT or different MCOTs, is also based on the resource requirements of the UE/UEs and the probability of active interference.

The grouping unit 106 forms a plurality of groups, in which each group includes a plurality of UEs. The process of associating UEs in a group is based on signaling parameters such as received signal strength indicator (RSSI), global positioning system (GPS), angle of arrival (AoA), direction of arrival (DoA), or the like. The grouping unit 106 allocates priorities to the plurality of UEs for controlling access of the allocated radio resources. This ensures efficient utilization of the unlicensed spectrum. Based on the priority of a particular UE, the UE performs an appropriate LBT mechanism. The grouping unit 106 broadcasts allocated priorities to the UEs associated with a group based on the radio network temporary identifier (RNTI), and RNTI of each UE.

FIG. 1 depicts a limited overview of the eNB 100 but it is to be understood that other embodiments are not limited thereto. The labels or names of the units are used only for illustrative purpose and does not limit the scope of the disclosure. Further, the eNB 100 can include any number of units or sub-units communicating among each other along with the other components. Likewise, the functionalities of one or more units can be combined by a single unit or can be distributed among each other in a manner different than described herein without departing from the scope of the disclosure.

Figure 2:
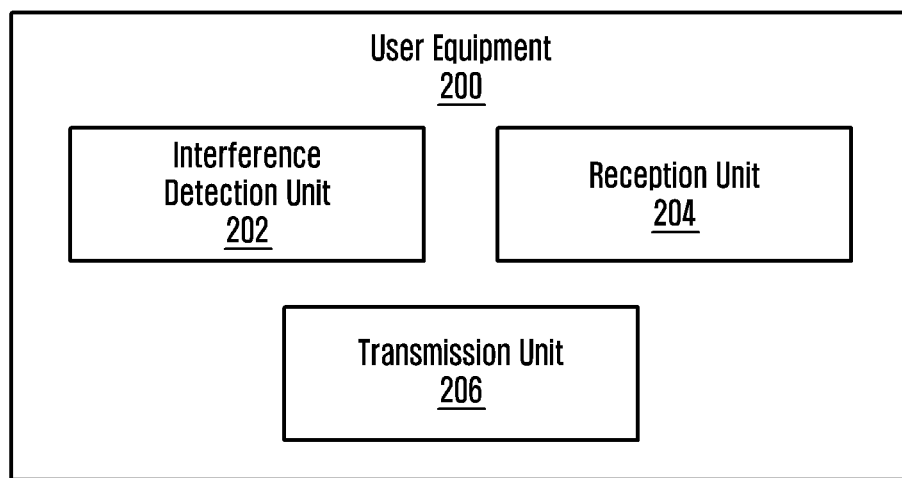
FIG. 2 depicts the various units of a UE implementing a method for performing uplink transmission in eLAA according to an embodiment of the present disclosure.

FIG. 2 depicts the various units of a UE 200 implementing a method for performing uplink transmission in eLAA according to an embodiment of the present disclosure.

Referring to FIG. 2, the UE 200 includes an interference detection unit 202, a reception unit 204, and a transmission unit 206.

The interference detection unit 202 performs an appropriate LBT procedure for a predefined period to detect a presence of interference in proximity of the UE 200. If the LBT procedure is successful, then the transmission unit 206 performs uplink transmission. If the LBT procedure fails, the transmission unit 206 suspends uplink transmission for either of a subframe period, a slot period, and a symbol period. Thereafter, the interference detection unit 202 again performs the LBT procedure to detect the presence of interference. The predefined period, for which the LBT procedure is performed by the interference detection unit 202, is based on the priority allocated to the UE 200, if the UE 200 is associated with a group.

The grant, from the eNB 100, is received by the reception unit 204. Thereafter, the interference detection unit 202 determines the presence of interference through performing the LBT procedure. If the LBT procedure, performed by the interference detection unit 202, is successful, then the uplink transmission is performed by the transmission unit 206 after a predefined standard delay from any subframe within the first subframe or the last subframe. The reception unit 204 receives the index values of the first subframe and the last subframe. The UE 200 is having the flexibility to perform uplink transmission from any subframe, within the first subframe and the last subframe.

If the UE 200 requests resources from the eNB 100 for uplink transmission which lasts for more than a MCOT period, then the interference detection unit 202 performs a different category of LBT procedure at the expiry of each MCOT, to detect the presence of interference, in proximity of the UE 200, prior to performing uplink transmission.

Referring to FIG. 2, a limited overview of the UE 200 but it is to be understood that other embodiments are not limited thereto. The labels or names of the units are used only for illustrative purpose and does not limit the scope of the disclosure. Further, the UE 200 can include any number of units or sub-units communicating among each other along with the other components. Likewise, the functionalities of one or more units can be combined by a single unit or can be distributed among each other in a manner different than described herein without departing from the scope of the disclosure.

Figure 3:
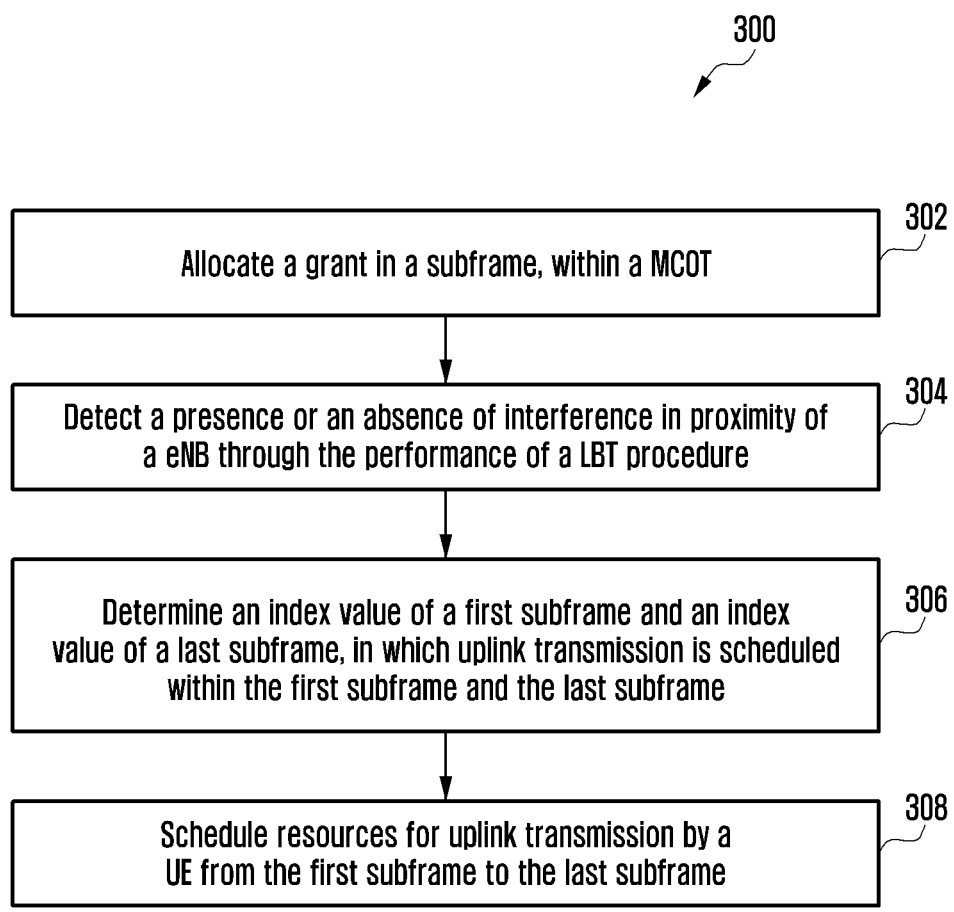
FIG. 3 is a flowchart depicting a method for performing multi-subframe scheduling in eLAA by the eNB according to an embodiment of the present disclosure.

FIG. 3 is a flowchart 300 depicting a method for performing multi-subframe scheduling in eLAA, by the eNB 100 according to an embodiment of the present disclosure. The eNB 100 allows multi-subframe scheduling in eLAA and provides flexibility to the UE 200 to perform uplink transmission within the first subframe and the last subframe.

At operation 302, the method includes allocating a grant in a subframe within a MCOT. The method allows the scheduling unit 104, in the eNB 100, to allocate the grant in a subframe. There is an existence of a predefined standard delay between the allocation of the grant and initiation of transmission.

At operation 304, the method includes detecting interference in proximity of the eNB 100 through the performance of a LBT procedure. The method allows the interference detection unit 102 to perform the LBT procedure for detecting a presence of active interference. The method includes determining the outcome of the LBT procedure. If the LBT procedure is successful, then the method allows the scheduling unit 104 to allocate the grant in a subframe. On the other hand, if the LBT procedure fails, then the method does not allow the scheduling unit 104 to allocate the grant for performing uplink transmission.

At operation 306, the method includes determining a first subframe and a last subframe within the MCOT. The method allows the scheduling unit 104 to determine the first subframe and the last subframe. The uplink transmission is initiated from the first subframe. The subframes in the MCOT are associated with index values. The determination of the first subframe and the last subframe includes determining the index values of the first subframe and the last subframe.

The grant, provided by the eNB 100, is valid for uplink transmission from the first subframe to the last subframe. If the grant is allocated in the $n^{th}$ subframe, in physical downlink control channel (PDCCH), can be utilized for uplink transmission of physical uplink control channel/physical uplink shared channel (PUCCH/PUSCH) anywhere between the first subframe and the last subframe, within one MCOT. The first subframe and the last subframe are located in the MCOT.

In order to determine the index values of the first subframe and the last subframe, in an embodiment, the method includes determining a MCOT value corresponding to a UE 200 and the MCOT value corresponding to the eNB 100. The method includes determining the index value of the first subframe and the index value of the last subframe based on the determined MCOT values of the UE 200 and the eNB 100.

The embodiment is dependent on maintaining an MCOT table at both the UE 200 and the eNB 100. The MCOT value is an indication of the amount of interference at a particular node. In an example, if the node (either UE 200 or eNB 100) detects the presence of interference (detected through a LBT procedure) in its proximity, then the MCOT value of the node is less in comparison with the standard MCOT value of the class of the LBT procedure, performed by the node. In an example, the MCOT value will be 8 ms, as opposed to 10 ms for class 3 and class 4 LBT procedures, if the presence of interference is detected. The history of the MCOT table values is an indicator of the history of the active interference seen at the node.

The MCOT table depicts number of times a particular MCOT value is achieved by a node, wherein achieved MCOT value can be also be related to the amount of interference in the proximity of the node. The indices N2, N3, N8 and N10 indicate the total number of times each MCOT value has been achieved by the node (UE 200 or eNB 100). Since, interference is a changing factor, utilization of a time-window based update of the MCOT table is proposed as shown.

The following depicts the MCOT table.

TABLE 1

MCOT Values

| MCOT Value | Number of times obtained in a time window "W" |
| --- | --- |
| 2 ms | N2 |
| 3 ms | N3 |
| 8 ms | N8 |
| 10 ms | N10 |

MCOT in the last W time instants, for example, N10=2, N8=0, and so on (MCOT reservation is performed only when a full category 4 LBT procedure is performed). A similar design is performed for computing and updating MCOT values at the UE 200.

Since the MCOT values of the UE 200 and the eNB 100 accounts for number of interfering nodes, the index value of the first subframe (denoted by k1) and index value of the last subframe (denoted by k2) are a function of MCOT values. Furthermore, the MCOT value of the UE 200 also allows accounting resource wastage. If the MCOT value of the UE 200 side is high then eNB has to allocate resources over a larger time period to the UE 200. Based on the MCOT value of the UE 200, the eNB 100 is has to determine the tradeoff between resource wastage and improved performance by accounting for LBT uncertainty.

The following table depicts the variation of index values of the first subframe and the last subframe based on the MCOT values of the eNB 100 and the UE 200.

TABLE 2

Index values of the first subframe and the last subframe

| MCOT (eNB) | MCOT (UE) | k2-k1 |
| --- | --- | --- |
| High | High | High |
| High | Low | Low |
| Low | High | Low |
| Low | Low | Low |

If the interference at the proximity of both the eNB 100 and UE 200 is high, then the grant allocated to the UE 200 is for a 'low' time period, and if the interference at the proximity of both the eNB 100 and UE 200 is low, then the grant allocated to the UE 200 is for a 'high' time period. The 'high' and 'low' is based on the comparison of the MCOT values at the UE 200 and eNB 100, by the eNB 100, with respect to a predefined threshold. In an example, if the eNB 100 determines that the number of times a specific MCOT value (in an example: 10 ms) is achieved is more than a threshold number of times, then the eNB 100 considers the MCOT value as 'high,' else the MCOT value is considered as 'low'.

In another embodiment, for determining the index values of the first subframe and the last subframe, the method includes determining a probability of interference at the UE and the probability of interference at the eNB. The method includes assigning a predefined index value for the first subframe. The method includes determining an index value of the last subframe based on the determined probabilities of the interferences at the UE, the eNB, and the predefined index value assigned to the first subframe.

In an example, the predefined index value (k1), assigned to the first subframe (the starting subframe after the first MCOT) is 0. Then k2 (index value of the second subframe) is the unknown parameter which can be evaluated as depicted in the following table:

TABLE 3

Index value of the second subframe

| $P_{intf}^{eNB}$ | $P_{intf}^{UE}$ | k2 |
| --- | --- | --- |
| <0.1 | <0.1 | 20 |
| [0.1, 0.2] | <0.1 | 19 |
| [0.1, 0.2] | [0.1, 0.2] | 18 |
| ... | ... | ... |
| ... | ... | ... |
| >0.9 | >0.9 | 1 |

Considering $p_{intf}^{eNB}$ as the probability of interference at the eNB 100 and considering $p_{intf}^{UE}$ as the probability of interference at the UE 200. The $p_{intf}^{eNB}$ is having an impact on the MCOT value of the eNB 100 and the $p_{intf}^{EU}$ is having an impact on the MCOT value of the UE 200. The UE 200 transmits its MCOT value to the eNB 100.

At operation 308, the method includes scheduling resources for uplink transmission from the first subframe to the last subframe. The method allows the scheduling unit 104 to allocate or reserve resources for the UE 200 to perform uplink transmission from any subframe of the MCOT within the first frame to the last frame.

The various actions, acts, blocks, operations, or the like in the flowchart 300 may be performed in the order presented, in a different order or simultaneously. Further, in some embodiments, some of the actions, acts, blocks, operations, or the like may be omitted, added, modified, skipped, or the like without departing from the scope of the disclosure. The method and other description provide a basis for a control program, which can be easily implemented by a microcontroller, microprocessor, or a combination thereof.

Figure 4:
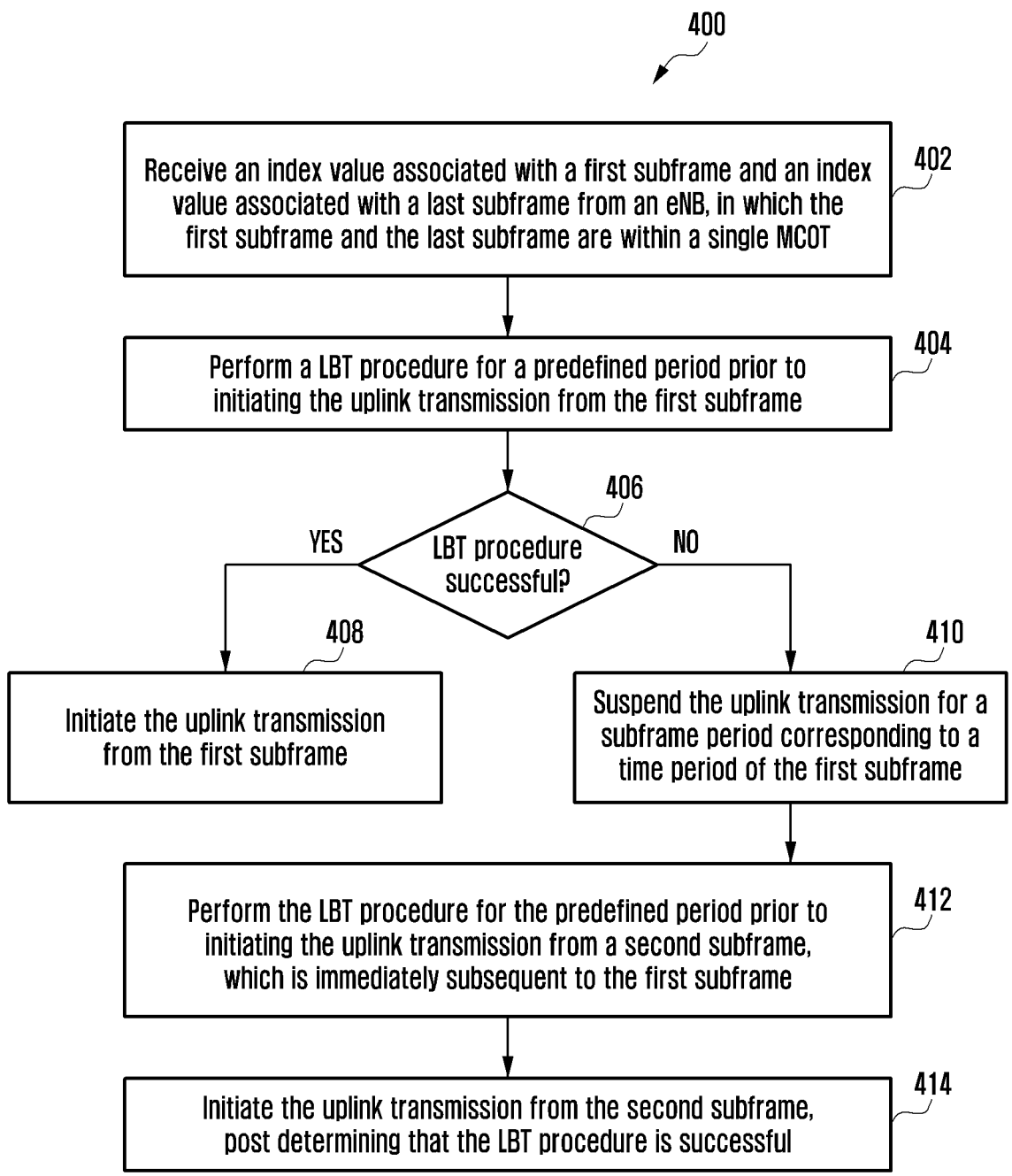
FIG. 4 is a flowchart depicting the method for performing uplink transmission in eLAA by the UE according to an embodiment of the present disclosure.

FIG. 4 is a flowchart 400 depicting the method for performing uplink transmission in eLAA by the UE 200 according to an embodiment of the present disclosure.

At operation 402, the method includes receiving the index value associated with the first subframe and the index value associated with the last subframe from the eNB 100. The method allows the reception unit 204 to receive the index values of the first subframe and the last subframe. The method allows the transmission unit 206 to transmit the MCOT value of the UE 200 to the eNB 100, to allow the eNB 100 to determine the index values of the first subframe and the last subframe. The eNB 100 determines the index values, as discussed in FIG. 3, and transmits the index values to the UE 200. The method determines that the first subframe and the last subframe are within a single MCOT based on the difference between the received index values.

At operation 404, the method includes performing a LBT procedure for a predefined period prior to initiating the uplink transmission from the first subframe. The method allows the interference detection unit 202 to perform an appropriate LBT procedure for a predefined period in order to detect interference in proximity of the UE 200.

At operation 406, the method includes determining whether the LBT procedure is successful. The method allows the interference detection unit 202 to determine whether the LBT procedure successful. At operation 408, the method includes initiating the uplink transmission from the first subframe, in response to determining that the LBT procedure is successful. Once the UE 200 receives the index values of the first subframe and the last subframe through the reception unit 204, the UE 200 determines the subframes which are allocated by the eNB 100 to perform the uplink transmission. Thereafter, the UE 200 performs the uplink transmission from any subframe, within the first subframe and the last subframe, through the transmission unit 206.

At operation 410, the method includes suspending the uplink transmission for a subframe period corresponding to a time period a subframe in the MCOT, in response to determining that the LBT procedure has failed.

At operation 412, the method includes performing the LBT procedure for the predefined period prior to initiating the uplink transmission from a second subframe. The second subframe is subsequent to the first subframe. The interference detection unit 202 performs the LBT procedure. The functionality of this operation is similar to that of operation 404. At operation 414, the method includes initiating the uplink transmission from the second subframe, post determining that the LBT procedure is successful. The functionality of this operation is similar to that of operation 408.

The various actions, acts, blocks, operations, or the like in the flowchart 400 may be performed in the order presented, in a different order or simultaneously. Further, in some embodiments, some of the actions, acts, blocks, operations, or the like may be omitted, added, modified, skipped, or the like without departing from the scope of the disclosure. The method and other description provide a basis for a control program, which can be easily implemented by a microcontroller, microprocessor, or a combination thereof.

Figure 5:
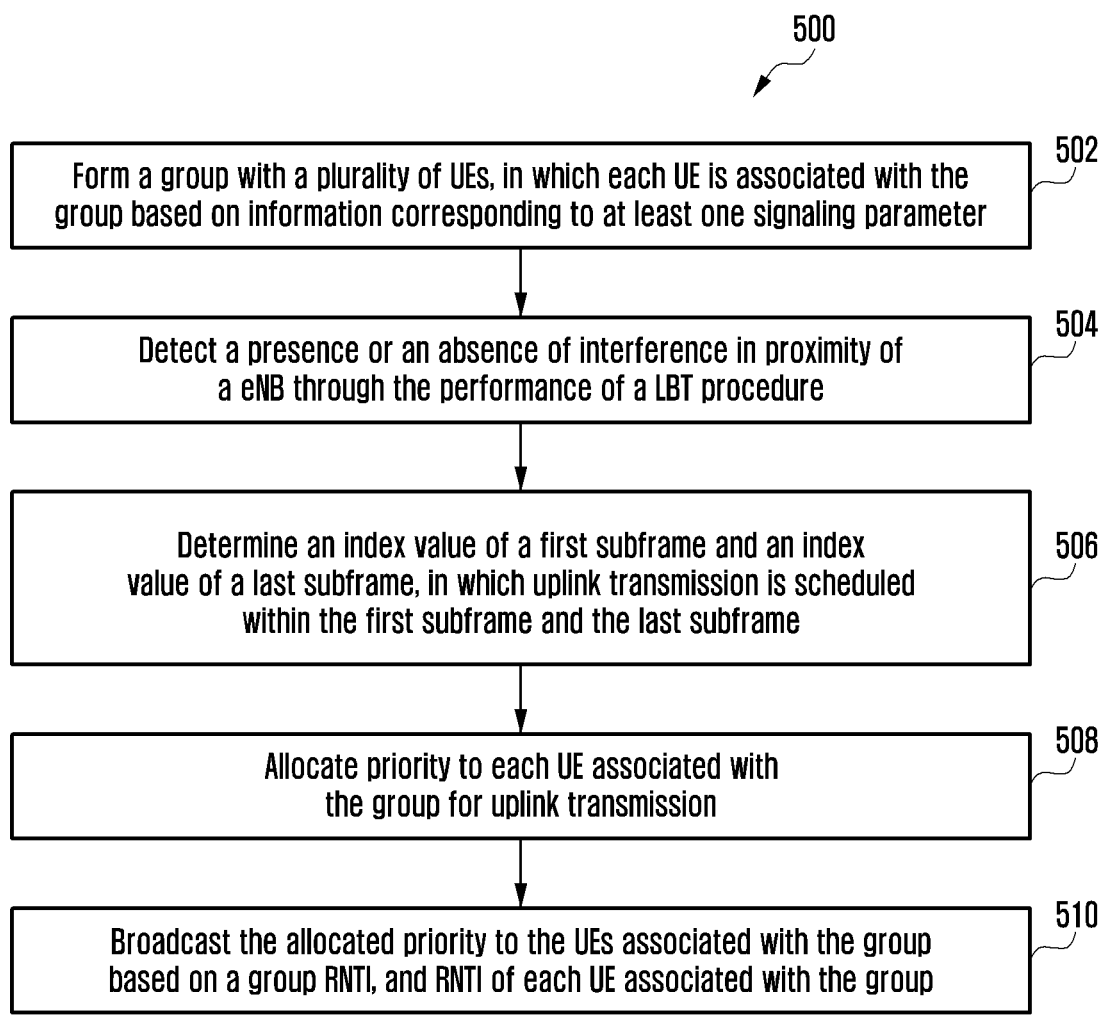
FIG. 5 is a flowchart depicting the method for performing multi-subframe scheduling for a plurality of UEs associated with a group in eLAA by an eNB according to an embodiment of the present disclosure.

FIG. 5 is a flowchart 500 depicting the method for performing multi-subframe scheduling for a plurality of UEs (200) associated with a group in eLAA by an eNB according to an embodiment of the present disclosure. The method enables scheduling of multiple UEs (200) associated with a formed group in conjunction with the flexible/multiple subframe scheduling discussed in FIG. 3.

At operation 502, the method includes forming a group with a plurality of UEs, in which each UE 200 is associated with the group based on information corresponding to at least one signaling parameter. The method allows the grouping unit 106, in the eNB 100, to associate the plurality of UEs (200) with the formed group. In an embodiment, the signaling parameter can be RSSI, GPS, AoA, DoA, or the like. The formation of group is performed in two levels using the different signaling parameters.

For the sake of brevity, the description for the operation 504 is not included here. However, the functionality executed by the operation 504 remains same as that of operation 304 in the flowchart 300.

At operation 506, the method includes determining the index value of the first subframe and the index value of the last subframe, in which uplink transmission is scheduled within the first subframe and the last subframe. The procedure of determining the index values of the first subframe and the last subframe is essentially same as that discussed in the operation 306 of the flowchart 300.

However, when a particular UE 200 requests a lot of resources for uplink transmission, the grant from the eNB 100 stands valid for multiple MCOT periods. In such circumstances, the difference between the index values of the first subframe and the last subframes is large. The first subframe and the last subframe, herein, are located in different MCOTs. Thus, the values of the first subframe and the last subframes is based on the MCOT values of the eNB 100, UE 200, and the requirement for resources for the uplink transmission by each UE 200 associated with the group. The proposed method can determine whether the first subframe and the last subframe are located in the same MCOT or different MCOTs, based on the difference between the index values of the first subframe and the last subframe.

At the end of each MCOT, the UE 200 performs a LBT procedure, the category of which is different from the LBT procedure, performed at operation 504. This is to ensure that there is an absence of interference in the proximity of the UE 200. Post performing this LBT the UE 200 initiates uplink transmission. If meanwhile, the eNB 100 detects interference in its proximity, then the eNB 100 transmits signaling messages to the UE/UEs (200) to suspend uplink transmission(s).

Necessary signaling for improvement in eLAA systems:

The proposed signaling mechanisms are implemented in the eNB 100 for performing multiple UE and multiple subframe scheduling in LTE-U systems. The signaling mechanisms significantly enhance the performance of LTE-U systems and other RAT's, which co-exist with the LTE, in the unlicensed bands.

When multiple subframe scheduling is employed and a large number of subframes, i.e., k2–k1, subframes are granted to the UEs for performing uplink transmission, the eNB 100 transmits signaling messages through the Primary-Cell (P-cell) or the licensed spectrum for indicating the rate of success of multiple subframe scheduling. Specifically, if the eNB 100 sends a signal "0" at a time instant on the P-cell, then all the subframe grants from this time instant become invalid. The eNB 100 can utilize such signaling if there is sudden increase in interference in the proximity of the eNB 100. If such signaling is not in place for multiple subframe grants, then the UEs (200) may waste resources by performing uplink transmissions on the multiple subframes allocated by the previous grant; and the eNB 100 will not be able to receive the uplink transmissions.

The signaling message can be included as part of:

physical broadcast channel (PBCH): The PBCH is received by all UEs (200) associated with the group. If a signaling message, from the eNB 100, instructs all UEs (200) to halt uplink transmissions, the signaling message is included as a part of the PBCH.

UE-specific system information block (SIB): The signaling message is included in the UE-specific SIB, where only one UE 200 needs to listen to the signaling message.

The signaling mechanisms improve the resource utilization and power utilization of the LTE-U systems as it takes into consideration the dynamic nature of the interference. This helps other radio access technologies (RATs) and improves the fairness. In an example, the UEs (200) performing uplink transmissions in multiple subframes halt their uplink respective transmissions based on the signaling messages received from the eNB 100, thereby facilitating Wi-Fi or other RAT nodes.

Standalone LTE in Unlicensed bands:

The embodiments can be extended for standalone operation of LTE in the unlicensed spectrum, where the eNB 100 can schedule multiple UEs (200) across multiple subframes. The signaling over P-Cell (for controlling the scheduling and invalidation of grants in case of sudden interference) can be included as part of the discovery reference signaling (DRS) signaling and be broadcasted every discovery measurement time configuration (DMTC) by the LTE-U systems. The periodicity of the DMTC can be varied to account for the performance improvements of the LTE-U systems and also other RATs. The embodiments relate to time-varying adaption of the MCOT values in order to account for the varying interference in the proximity of the eNB 100 and UEs (200). The embodiments are applicable across a wide variety of future wireless systems irrespective of the signaling procedures followed.

At operation 508, the method includes allocating priority to each UE 200 associated with the group, for uplink transmission. The eNB 100 allocates resources for uplink transmission by the plurality of UEs (200) associated with the group. The method allows the scheduling unit 104 to allocate the priority of LTE-U resource utilization to each of the UEs (200) associated with the group.

The UEs (200) associated with a group are allocated with shared resources. Since the UEs (200) are geographically located apart from each other, the interference at each UE 200 associated with the group may be different. While radio resource is sensed free by a UE (200), another UE (200) may detect interference from other nodes in its proximity. Hence, it is not possible to schedule the plurality of UEs (200) simultaneously. Furthermore, even if the interference at both UEs is the same, due to geometry constraints, the UEs (200) cannot be scheduled simultaneously.

Hence, the eNB 100 assigns priorities to the UEs (200) associated with the group and the UEs (200) access the LTE-U spectrum based on the priority allocated by the eNB 100. In other words, a UE 200 with a low priority utilizes resources which are different from the resources assigned to a UE 200 with a higher priority. The priority allocated to each UE 200 is based on at least one of state of charge (SoC) of battery of the UEs (200), TAV, data buffer condition of the UEs (200), and type of data to be transmitted by the UEs (200). If a particular UE 200 is having highest priority amongst the other UEs (200) associated with the group, then that particular UE 200 is having the leverage to initiate uplink transmission from the first subframe without performing the LBT procedure. The UEs (200) having lower priority have to perform LBT procedure for longer periods in comparison with the UEs (200) having higher priority.

The allocation of priorities to the UEs (200) allows access control, which allows efficient utilization of the unlicensed spectrum, and prevents radio resource wastage by the UEs (200), which perform uplink transmission without coordinating with each other.

In order to have fairness among the UEs (200), the eNB 100, can in a cyclic manner, change the priority of the UEs (200) after the expiry of a specific time window. However, this is an eNB 100 implementation and the optimization of this time window is beyond the scope of this disclosure.

At operation 510, the method includes broadcasting the allocated priority to the UEs (200) associated with the group based on a group RNTI, and RNTI of each UE 200 associated with the group. The method allows the grouping unit 106 to broadcast the allocated priorities to the different UEs (200). In order to broadcast the allocated priorities and other signaling information to the UEs (200) associated with the group, either about the resource allotment or transmission schedules, the eNB 100 uses the following signaling parameters:

Group-RNTI: This is used by the eNB 100 for informing the UEs (200) associated with a particular group about the resource allotment.

Group-RNTI and C-RNTI: This used by the eNB 100 to send data, transmitter power control (TPC), or the like, simultaneously to all the UEs (200) associated with the group.

The various actions, acts, blocks, operations, or the like in the flowchart 500 may be performed in the order presented, in a different order or simultaneously. Further, in some embodiments, some of the actions, acts, blocks, operations, or the like may be omitted, added, modified, skipped, or the like without departing from the scope of the disclosure. The method and other description provide a basis for a control program, which can be easily implemented by a microcontroller, microprocessor, or a combination thereof.

Figure 6:
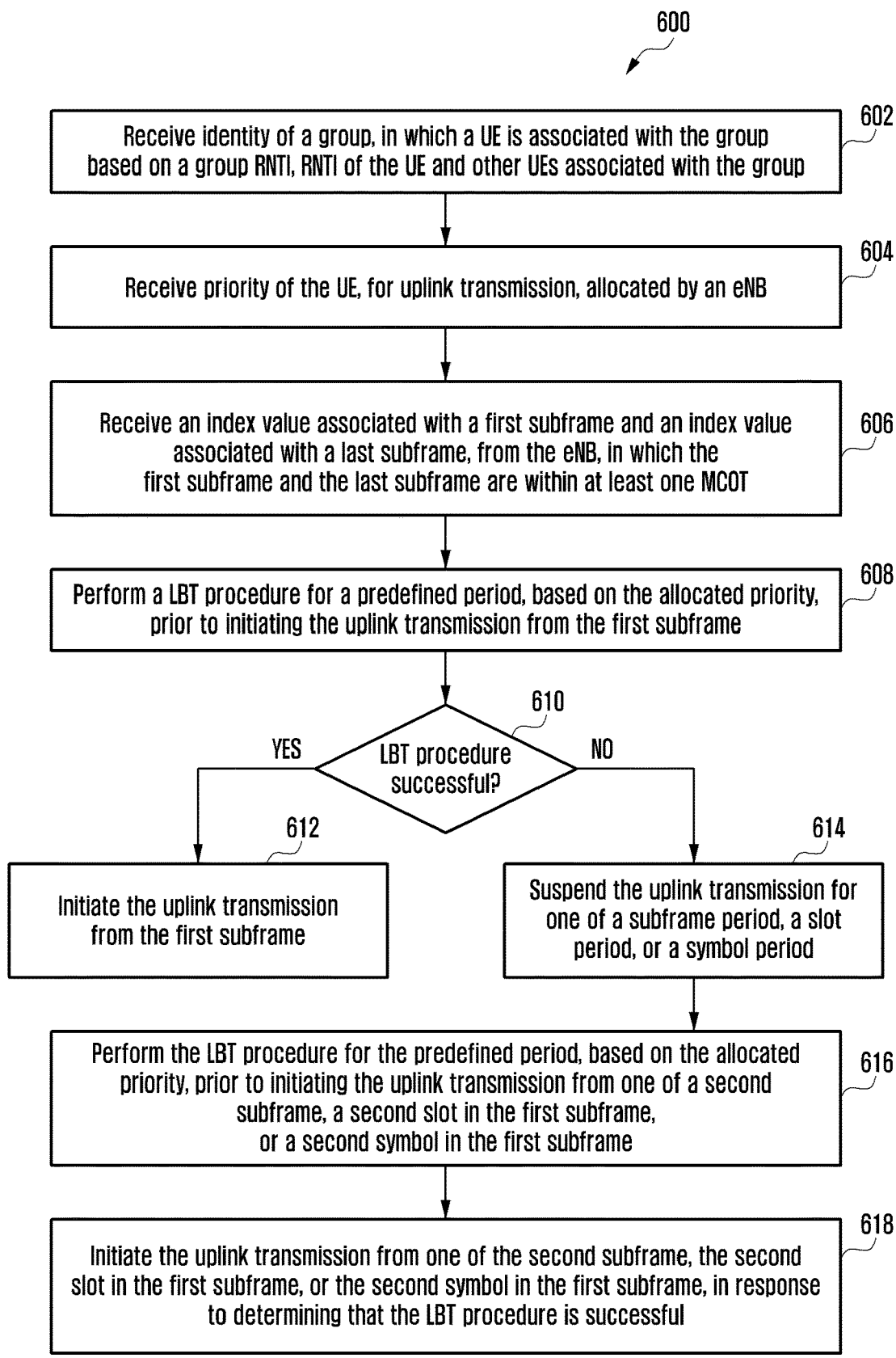
FIG. 6 is a flowchart depicting the method for performing uplink transmission in eLAA by a UE according to an embodiment of the present disclosure.

FIG. 6 is a flowchart 600 depicting the method for performing uplink transmission in eLAA, by a UE 200 according to an embodiment of the present disclosure.

At operation 602, the method includes receiving an identity of the group, with which the UE 200 is associated with. The method allows the reception unit 204 to receive the group identity, broadcasted by the eNB 100. The group identity is determined by the eNB 100 based on the group RNTI, RNTI of the UE 200 and RNTI of the other UEs (200) associated with the group.

At operation 604, the method includes receiving the priority of the UE 200, for uplink transmission, allocated by the eNB 100. The method allows the reception unit 204 to receive the allocated priority, broadcasted by the eNB 100.

At operation 606, the method includes receiving the index value associated with the first subframe and the index value associated with the last subframe, from the eNB 100, in which the first subframe and the last subframe are within at least one MCOT. The procedure of determining the index values of the first subframe and the last subframe is essentially same as that discussed in the operation 402 of the flowchart 400. The method allows the transmission unit 206 to transmit the MCOT value of the UE 200 to the eNB 100, to allow the eNB 100 to determine the index values of the first subframe and the last subframe. The eNB 100 determines the index values of the first subframe and the last subframe and transmits the index values to the UE 200.

However, when the UE 200 requires significant resources for performing uplink transmission, the grant received from the eNB 100 stands valid for multiple MCOT periods. In such circumstances, post receiving the index values of the first subframe and the last subframe, the UE 200 determines that the first subframe and the last subframe are located in different MCOTs. The proposed method can determine whether the first subframe and the last subframe are located in the same MCOT or different MCOTs, based on the difference between the index values of the first subframe and the last subframe.

For the sake of brevity, the description for the operations 608-610 is not included here. However, the functionality executed by the operations 608-610 remains same as that of operations 404-406 in the flowchart 400.

At operation 612, the method includes initiating the uplink transmission from the first subframe, in response to determining that the LBT procedure is successful. Once the UE 200 receives the index values of the first subframe and the last subframe through the reception unit 204, the UE 200 determines the subframes which are allocated by the eNB 100 to perform the uplink transmission. Thereafter, the UE 200 initiates performing the uplink transmission from any subframe, within the first subframe and the last subframe, through the transmission unit 206. The method also allows the UE 200 to initiate the performance of the uplink transmission from any slot or any symbol, in any subframe within the first subframe and the last subframe.

At operation 614, the method includes suspending the uplink transmission for one of a subframe period, a slot period, or a symbol period, in response to determining that the LBT procedure has failed. The subframe period corresponds to the time period of a subframe in the MCOT. The slot period and the symbol period correspond to the time period of the slot period and symbol period respectively of a subframe in the MCOT.

At operation 616, the method includes performing the LBT procedure for the predefined period prior to initiating the uplink transmission from one of a second subframe, a second slot in the first subframe, or a second symbol in the first subframe. The second subframe is subsequent to the first subframe. The method allows the interference detection unit 202 to perform the LBT procedure. The functionality of this operation is similar to that of operation 608. At operation 618, the method includes initiating the uplink transmission from one of the second subframe, the second slot in the first subframe, or the second symbol in the first subframe, post determining that the LBT procedure is successful. The functionality of this operation is similar to that of operation 612.

The various actions, acts, blocks, operations, or the like in the flowchart 600 may be performed in the order presented, in a different order or simultaneously. Further, in some embodiments, some of the actions, acts, blocks, operations, or the like may be omitted, added, modified, skipped, or the like without departing from the scope of the disclosure. The method and other description provide a basis for a control program, which can be easily implemented by a microcontroller, microprocessor, or a combination thereof.

Figure 7:
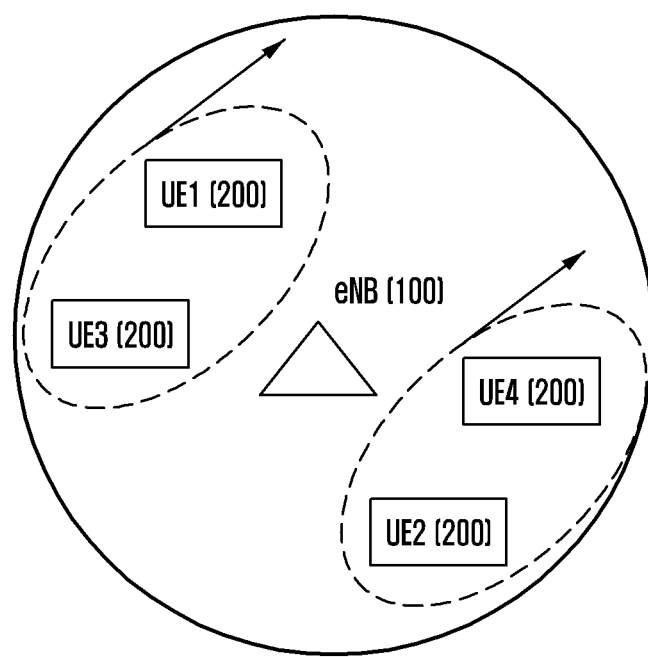
FIG. 7 illustrates grouping UE grouping by the eNB according to an embodiment of the present disclosure.

FIG. 7 illustrates grouping UE (200) grouping by the eNB 100 according to an embodiment of the present disclosure. In order to perform multiple UE (200) scheduling, the eNB 100 initially forms groups by associating UEs (200) based on signaling parameters. Each group may consist of multiple UEs. As depicted in FIG. 7, the eNB 100 forms two groups, viz., group 1 and group 2. The eNB 100 associates two UEs (200) in each of the groups. For ease of exposition, each group is depicted with two UEs (200). It is to be noted that the number of UEs associated with a certain group can be more than two.

Figure 8:
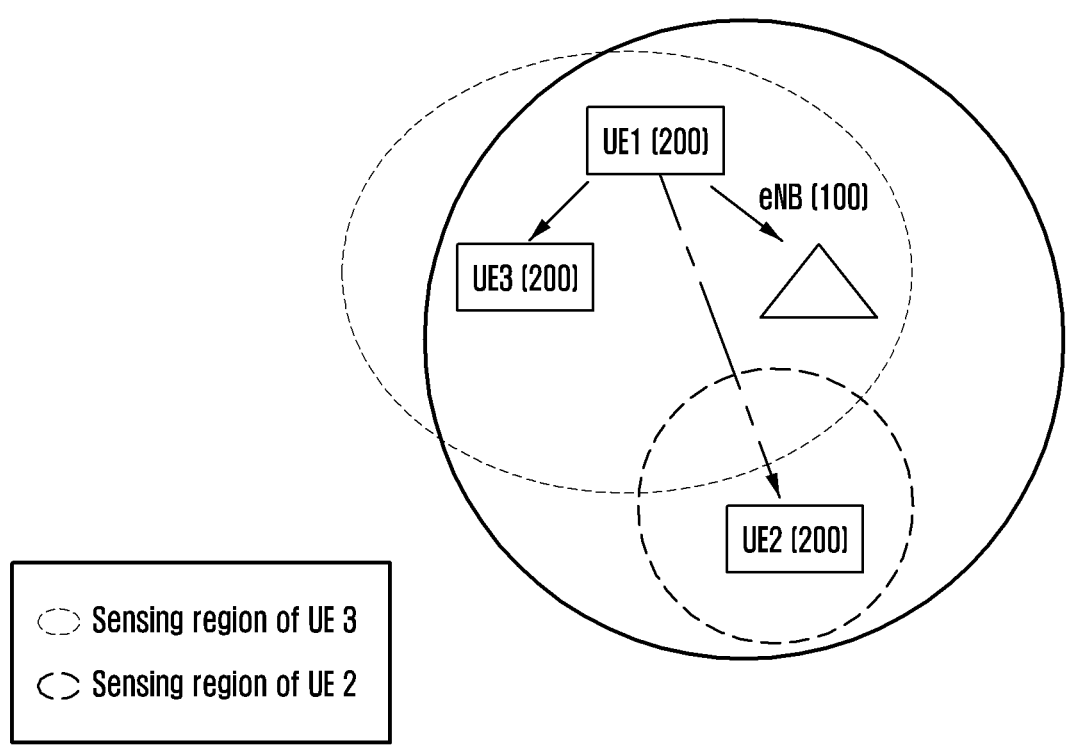
FIG. 8 illustrates grouping of UEs formed by eNB based on sensing constraints according to an embodiment of the present disclosure.

FIG. 8 illustrates grouping of UEs (200), formed by eNB 100 based on sensing constraints according to an embodiment of the present disclosure. The eNB 100 has to adhere to constraints while forming groups consisting of UEs (200). In an example, each UE 200 associated with a group must be capable of hearing/receiving the transmissions, with sufficient power, from the other UEs (200) associated with the same group. This enables each UE 200 to sense, whether other UEs (200) are utilizing the resources, shared amongst the UEs (200) associated with the group.

Referring to FIG. 8, the uplink transmission from UE 1 is heard well by UE 3, but not heard well enough by UE 2 with sufficient sensitivity. As such, the eNB 100 associates UE 1 and UE 3 into a single group based on the constraint. However, this is a coarse procedure of grouping. The grouping mechanism will be further elaborated in FIG. 9.

Figure 9:
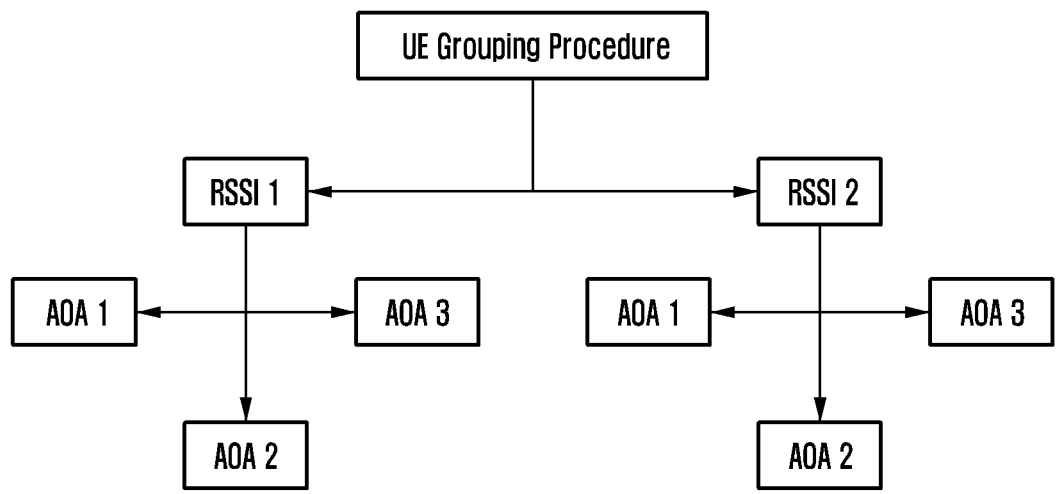
FIG. 9 illustrates a two-level grouping mechanism followed by the eNB, to perform UE grouping according to an embodiment of the present disclosure.

FIG. 9 illustrates a two-level grouping mechanism followed by the eNB 100, to perform UE grouping according to an embodiment of the present disclosure. The grouping procedure, as depicted in FIG. 8, is based on the RSSI. However this procedure of grouping is not completely accurate due to the fact that, the RSSI metric heavily depends on the receiver sensitivity and may not be accurate if performed for a short duration. In order to ensure reliable UE grouping by utilizing the RSSI metric, averaging needs to be performed for longer time duration.

As such, the grouping unit 106 utilizes other signaling parameters such as AoA, DoA, AoD, or the like, to perform grouping. The grouping procedure is performed in two levels. In the first level, the eNB 100 identifies the RSSI levels received from each UE 200, in order to temporarily associate UEs (200) in a group. The UEs (200) which are temporarily associated with the group are having a RSSI value, which is greater than a predefined threshold RSSI. At this stage, the eNB 100 can also utilize timing alignment values (TAV) or MCOT values of the UEs (200) in the network. In the second level, the eNB 100 identifies the geographical locations of the temporarily associated UEs (200) such as GPS information, AoA information, and DoA information (for multiple input, multiple output (MIMO) based systems). Thereafter, the disseminated AoA/DoA information, allows the eNB 100 to determine the directions from which the temporarily associated UEs (200) are transmitting. The temporarily associated UEs (200), which are transmitting along the same direction, are permanently associated with the same group.

Therefore, performing the grouping procedure in two levels ensure that each UE 200 permanently associated with the group can hear the transmission of other permanently associated UEs (200).

Figure 10A:
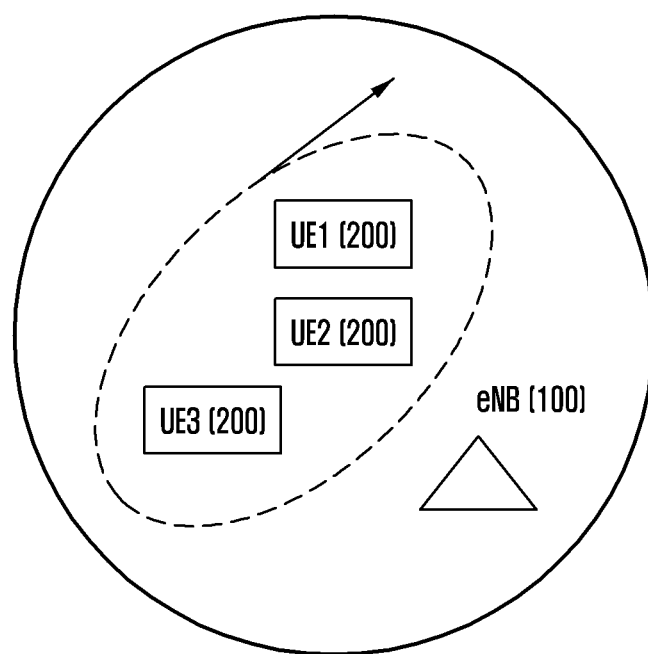
FIGS. 10A and 10B illustrate first level and second level UE grouping respectively according to various embodiments of the present disclosure.
Figure 10B:
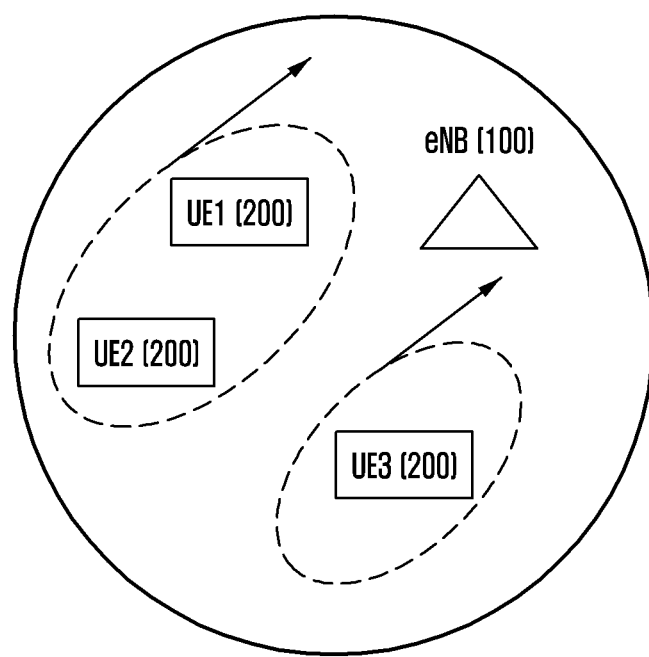

FIGS. 10A and 10B illustrate first level and second level UE grouping respectively according to various embodiments of the present disclosure.

Referring to FIG. 10A, post completion of the first level grouping, the eNB 100 temporarily associates UE 1, UE 2 and UE 3 in a group. The grouping is performed based on the RSSI signaling parameter. As depicted in FIG. 10B, based on GPS, AoA, and DoA information, the eNB 100 permanently associates UE 1 and UE 2 in the second level grouping, while UE 3 is disassociated with the group.

Figure 11:
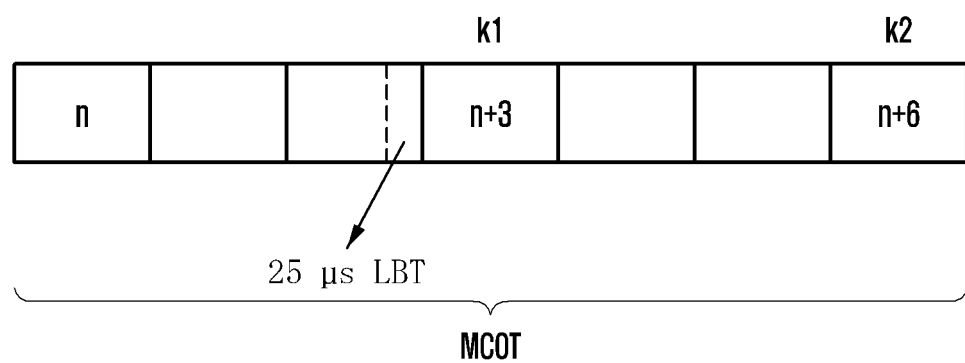
FIG. 11 illustrates flexible scheduling of subframes for performing uplink transmission by a UE according to an embodiment of the present disclosure.

FIG. 11 illustrates flexible scheduling of subframes for performing uplink transmission by a UE 200 according to an embodiment of the present disclosed herein.

Referring to FIG. 11, the eNB 100 transmits a grant in the $n^{th}$ subframe to the UE 200 to initiate uplink transmission. The grant received in $n^{th}$ subframe, in the PDCCH, can be used by the UE 200 to transmit one PUCCH/PUSCH anywhere between the first subframe and the last subframe. This provides flexibility to the UE 200 to perform uplink transmission. The $(n+3)^{th}$ subframe is the first subframe and the $(n+6)^{th}$ subframe is the last subframe. The grant received at the $n^{th}$ subframe stands valid till the $(n+6)^{th}$ subframe. The index value of the $(n+3)^{th}$ subframe is k1, and the index value of the $(n+6)^{th}$ subframe is k2. The index values of the $(n+3)^{th}$ subframe and the $(n+6)^{th}$ subframe are received from the eNB 100. The first subframe and the last subframe are within one MCOT. The eNB 100 reserves the resources for uplink transmission by the UE 200 between the first subframe and the last subframe.

There is a standard predefined delay between the subframe in which the grant is received ($n^{th}$ subframe) and the first subframe ($(n+3)^{th}$ subframe). The UE 200 is allowed to initiate uplink transmission from the first subframe. If the UE 200 initiates uplink transmission from the $(n+3)^{th}$ subframe, then the UE 200 performs a LBT procedure for a predefined period in order to detect a presence or absence of interference in the LTE-U spectrum. In an example, the LBT procedure is performed for 25 μs.

Figure 12:
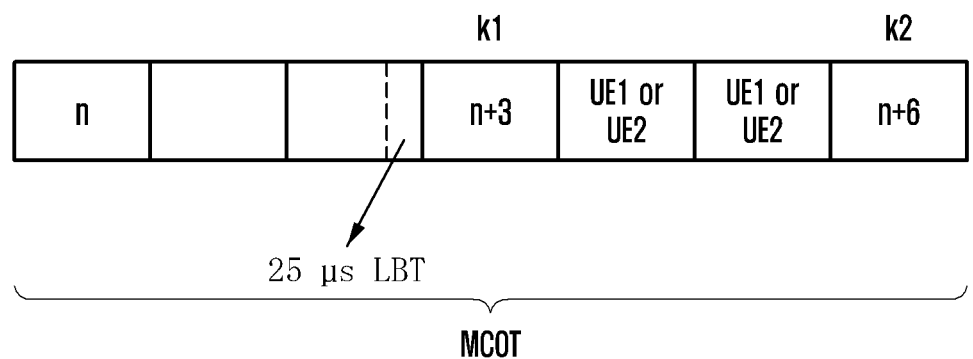
FIG. 12 illustrates flexible scheduling of subframes for performing uplink transmission by a plurality of UEs associated with a group according to an embodiment of the present disclosure.

FIG. 12 illustrates flexible scheduling of subframes for performing uplink transmission by a plurality of UEs 200 associated with a group according to an embodiment of the present disclosure.

Referring to FIG. 12, the eNB 100 transmits a grant in the $n^{th}$ subframe to UE1 200 and UE2 200, associated with a group, to perform uplink transmission. The UEs 200, associated with the group, have the flexibility to perform uplink transmission from the $(n+3)^{th}$ subframe to the $(n+6)^{th}$ subframe.

The eNB 100 allocates different priority to the UE1 200 and the UE 2 200. The allocated priorities are broadcast to the UE 200 and based on the allocated priorities, the UE1 200 and the UE2 200 perform the uplink transmission.

Considering that UE1 200 is having a higher priority and UE2 200 is having a lower priority. Based on the priorities, the UEs 200 perform LBT procedures for different periods at different times within the $(n+3)^{th}$ subframe to the $(n+6)^{th}$ subframe. The UE with a higher priority performs the LBT procedure for a shorter period in comparison with the UE with a lower priority. In an example, if the UE1 200 initiates uplink transmission from the $(n+3)^{th}$ subframe, then the UE1 200 performs the LBT procedure in order to detect a presence or absence of interference in the LTE-U spectrum, while UE2 200 does not perform any LBT procedure to initiate uplink transmission. The UE2 200 may perform the LBT procedure prior to the $(n+4)^{th}$ subframe. The LBT procedure is performed for 25 μs.

Figure 13A:
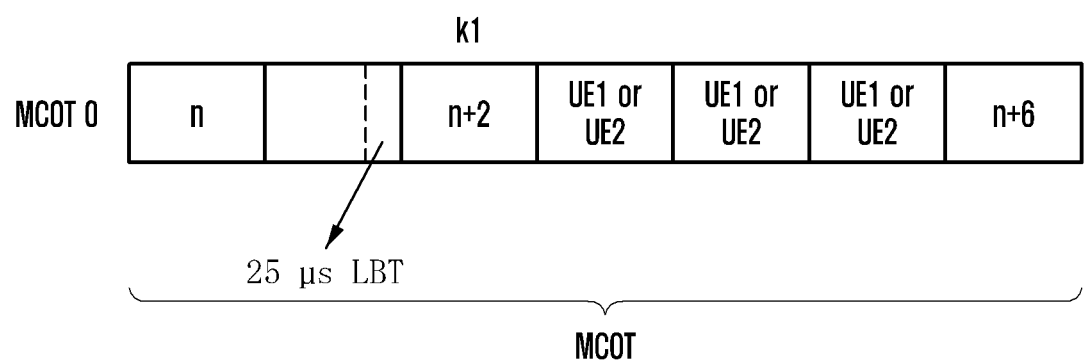

FIGS. 13A to 13C illustrates scheduling of subframes for performing uplink transmission across multiple MCOTs according to various embodiment of the present disclosure.

Referring to FIGS. 13A to 13C, the eNB 100 reserves resources across subframes located in multiple MCOTs. Considering two UEs 200, i.e., UE1 200 and UE2 200, associated with a group. One of the UEs 200, requests for a significant amount of resources for performing uplink transmission. The eNB 100 performs a LBT procedure to determine a presence or an absence of interference in its proximity. The eNB 100 performs multiple subframe scheduling post determining an absence of interference. The eNB 100 schedules subframes across multiple MCOTs in order to account for the resources requested by one of the UEs 200.

The UEs 200, i.e., UE1 200 and UE2 200, determine that the first subframe and the last subframe are located in different MCOTs based on the difference between the index values of the first subframe and the last subframe. In an example, the eNB 100 allocates subframes across 'm' MCOTs. The eNB 100 transmits a grant in the $n^{th}$ subframe of MCOT 0. The UEs 200, associated with the group, have the flexibility to perform uplink transmission from the $(n+2)^{th}$ subframe of the MCOT 0 to the $(n+2)^{th}$ subframe of MCOT 'm'.

The eNB 100 allocates different priority to the UE1 200 and the UE 2 200. The allocated priorities are broadcast to the UE 200 and based on the allocated priorities, the UE1 200 and the UE2 200 perform the uplink transmission. In order to account for uncertainties in the LTU-U spectrum, the UEs 200 perform a LBT procedure of a certain category (longer than 25 μs), different from the category of LBT procedure performed prior to initiating uplink transmission from a subframe, at the start of each MCOT.

eNB Signaling: Once the UEs 200 associated with the group have finished performing uplink transmission, the eNB 100 can perform one of the following actions:

The eNB 100 can schedule other UEs 200, associated with other groups, in the subframes which were utilized by the UE1 200 and the UE2 200.

The eNB 100 can transmit a signal on the licensed spectrum to the UEs 200 indicating that the grants are now invalid.

In an example, if both UEs 200 finish performing uplink transmission within $(n+2)^{th}$ subframe of MCOT 'm', then the eNB 100 can send an End of Transmission (EoT) signal. This signal indicates that the eNB 100 has completed all scheduling procedures and other nodes/other RATs can utilize using the LTE-U spectrum. Thus, the method improves the utilization of the LTE-U spectrum and allows fair-coexistence of different RATs.

The multiple UE-multiple subframe scheduling enhances the performance of eLAA. If interference in the proximity of the eNB 100 is high or low, then the eNB 100 can hold or assign resources respectively. The eNB 100 allocates resources to the UEs 200 for a short or a long period while accounting for LBT uncertainty at the UEs 200. The UEs (200, based on the success of the LBT procedures, can perform uplink transmission in any of the multiple subframes, within the first subframe and the last subframe. If the UE1 200, with a higher priority, does not utilize the allocated grants or subframes within a multi-subframe grant, then UE2 200 can utilize the allocated grants or subframes, if required. The UE2 200 can either perform LBT procedure at every subframe (within the first subframe and the last subframe), or can periodically perform the LBT procedure based on data buffer conditions.

Figure 14A:
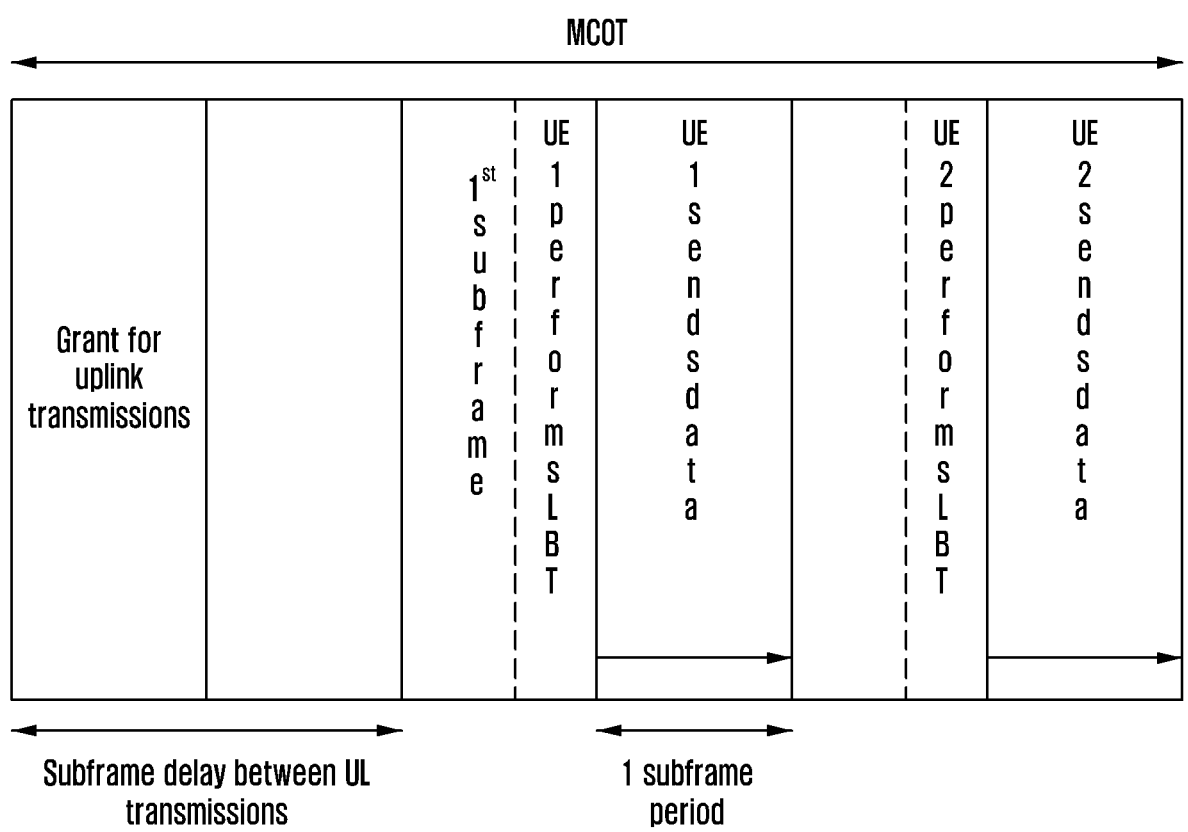
FIGS. 14A and 14B illustrates a use case scenario depicting subframe-level scheduling for performing uplink transmission by the plurality of UEs according to various embodiments of the present disclosure.
Figure 14B:
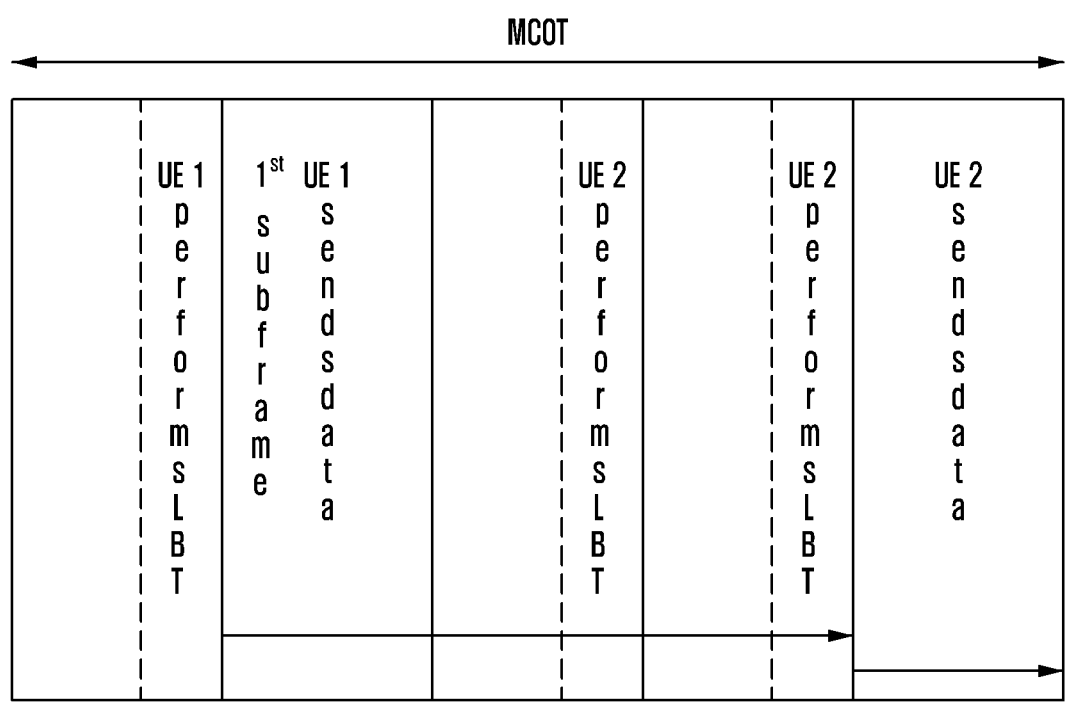

FIGS. 14A and 14B illustrates a use case scenario depicting subframe-level scheduling for performing uplink transmission by the plurality of UEs 200 according to various embodiments of the present disclosure.

Referring to FIG. 14A, considering UE1 200 and UE2 200 are associated with a group. The UE1 200 is allotted with a high priority, while UE2 200 is allotted with a low priority. There is a delay of two subframes between the subframe at which grant is allotted and the first subframe. The UE 1 200 performs a LBT procedure for a predefined period in the first subframe, in order to determine the interference in the proximity of the UE1 200, prior to initiating the uplink transmission from the second subframe. The UE1 200 initiates the uplink transmission from the second subframe in response to determining that the LBT procedure, performed in the first subframe, is successful. While UE1 200 performs uplink transmission in the second subframe, the UE2 200 performs a LBT procedure for a predefined period, in order to determine whether the UE1 200 having high priority, is using the shared resources allocated by the eNB 100. The UE2 200 initiates the uplink transmission from the fourth subframe in response to determining that the LBT procedure performed in the third subframe is successful.

Referring to FIG. 14B, the UE 1 200 performs a LBT procedure for a predefined period, in order to determine the interference in the proximity of the UE1 200, prior to initiating the uplink transmission from the first subframe. The UE1 200 initiates the uplink transmission from the first subframe in response to determining that the LBT procedure is successful. While UE1 200 performs uplink transmission from the first subframe, the UE2 200 performs a LBT procedure in the second subframe for a predefined period, in order to determine whether the UE1 200 having high priority, is using the shared resources allocated by the eNB 100. The UE2 200 suspends initiating the uplink transmission for a subframe period (second subframe) corresponding to a time period of a subframe in the MCOT, in response to determining that the LBT procedure is failed. Since the UE1 200 is using the shared resources in the first subframe and the second subframe, the LBT procedure performed by the UE2 200 fails.

Thereafter, the UE2 200 performs the LBT procedure in the third subframe for the predefined period prior to initiating the uplink transmission from the fourth subframe. The UE2 200 initiates the uplink transmission from the fourth subframe in response to determining that the LBT procedure performed in the third subframe is successful.

Figure 15A:
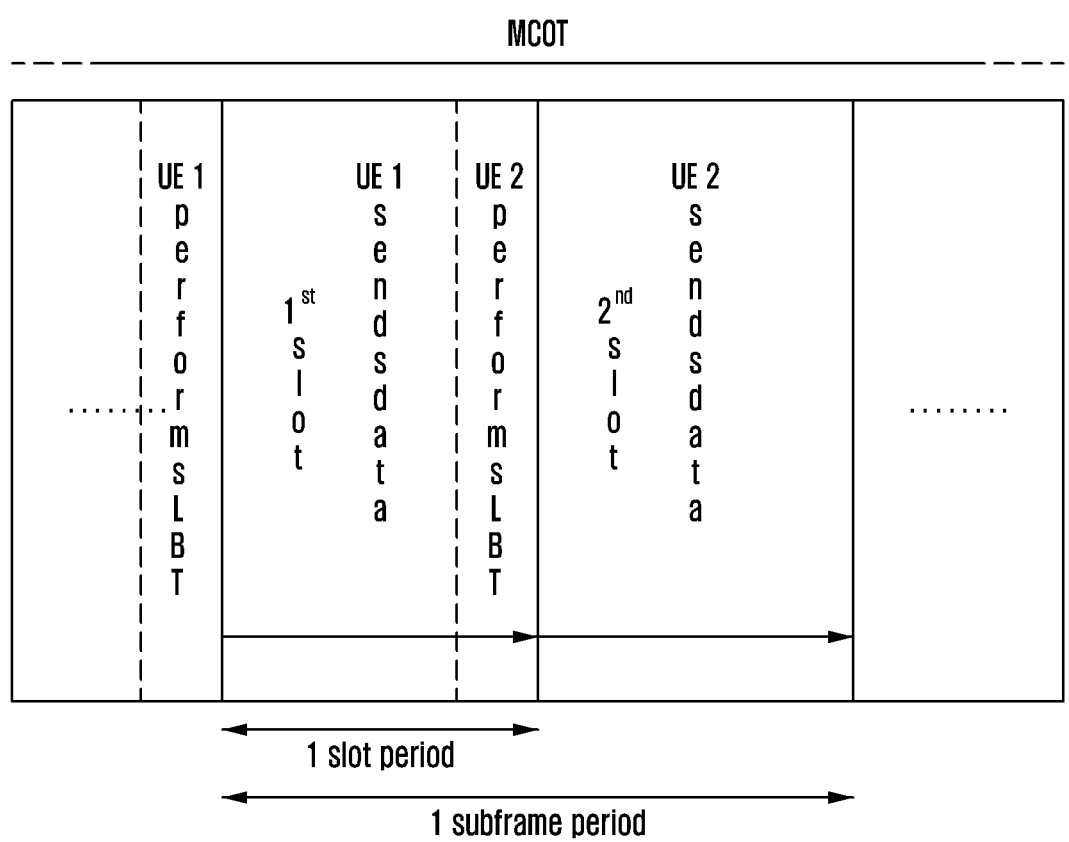
FIGS. 15A and 15B illustrates a use case scenario depicting slot-level scheduling for performing uplink transmission by the plurality of UEs according to various embodiment of the present disclosure.
Figure 15B:
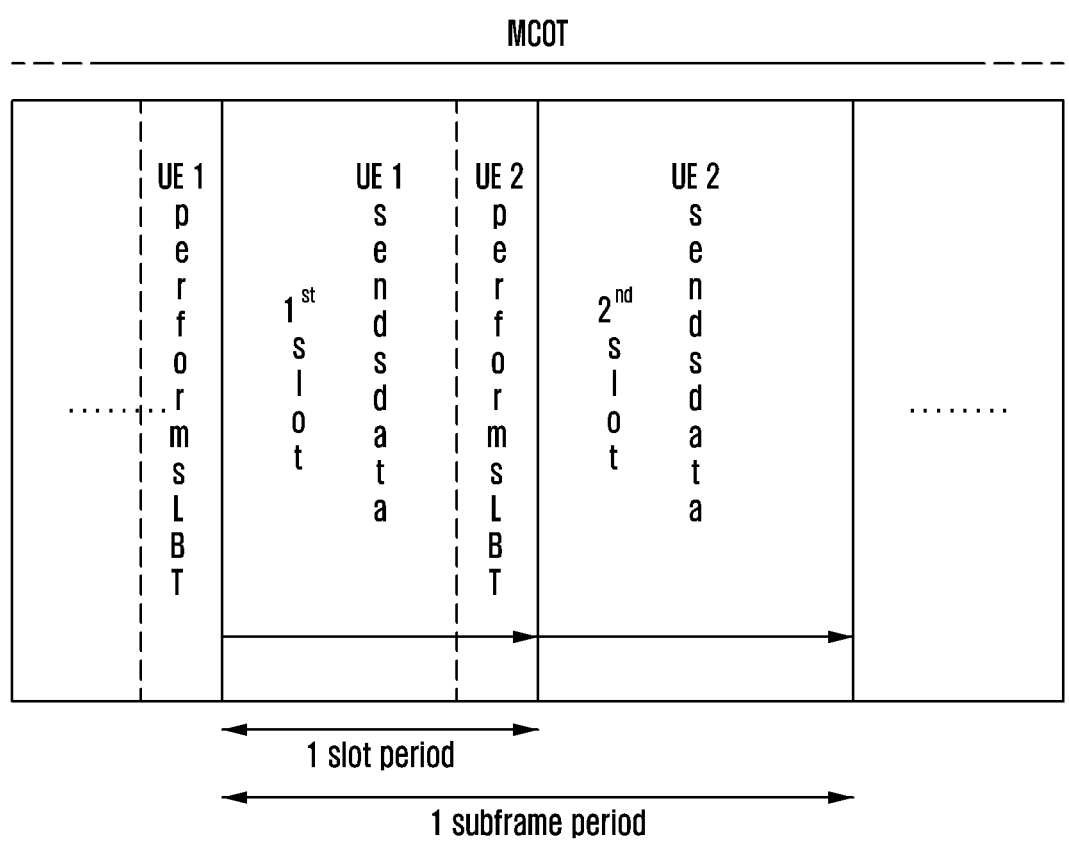

FIGS. 15A and 15B illustrates a use case scenario depicting slot-level scheduling for performing uplink transmission by the plurality of UEs according to various embodiments of the present disclosure.

Referring to FIG. 15A, considering UE1 200 and UE2 200 are associated with a group. The UE1 200 is allotted with a high priority, while UE2 200 is allotted with a low priority. The eNB 100 performs slot level scheduling herein. The UEs 200 are able to perform uplink transmissions in the slots of an allocated subframe. The UEs 200 are performing the uplink transmission in the first and second slots respectively in a subframe within the MCOT.

The UE 1 200 performs a LBT procedure for a predefined period prior to the first slot, in order to determine the interference in the proximity of the UE1 200, prior to initiating the uplink transmission from the first slot. The UE1 200 initiates the uplink transmission from the first slot in response to determining that the LBT procedure, performed in the first slot, is successful. While UE1 200 performs uplink transmission in the first slot, the UE2 200 performs a LBT procedure for a predefined period, in order to determine whether the UE1 200 having high priority, is using the shared resources allocated by the eNB 100. The UE2 200 initiates the uplink transmission from the second slot in response to determining that the LBT procedure is successful.

Referring to FIG. 15B, while UE1 200 performs uplink transmission in the first slot, the UE2 200 performs a LBT procedure for a predefined period, in order to determine whether the UE1 200 having high priority, is using the shared resources allocated by the eNB 100. The UE2 200 suspends initiating the uplink transmission for a slot period, (second slot in the subframe) in response to determining that the LBT procedure is failed. Since the UE1 200 is using the shared resources in the first slot and the second slot, the LBT procedure performed by the UE2 200 fails.

Figure 16:
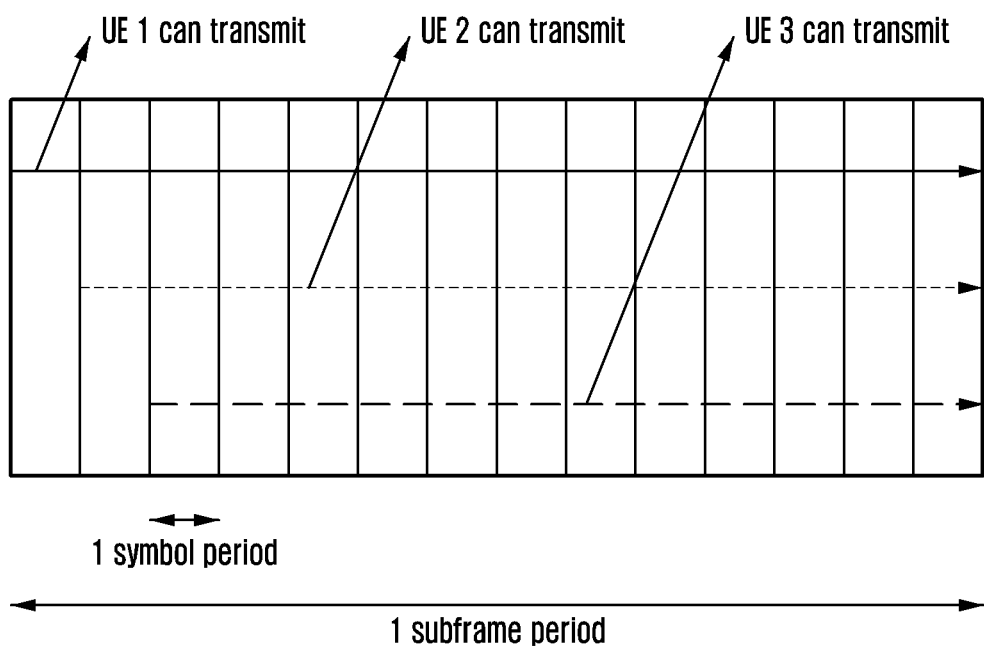
FIG. 16 illustrates a use case scenario depicting symbol-level scheduling for performing uplink transmission by the plurality of UEs according to an embodiment of the present disclosure.

FIG. 16 illustrates a use case scenario depicting symbol-level scheduling for performing uplink transmission by the plurality of UEs 200 according to an embodiment of the present disclosure herein.

Referring to FIG. 16, considering UE1 200, UE2 200 and UE3 200 are associated with a group. The UE1 200 is allotted with a first priority, UE2 200 is allotted with a second priority and UE3 200 is allotted with a third priority. The eNB 100 performs symbol level scheduling, in which the different UEs 200 are able to perform uplink transmissions in the different symbols of an allocated subframe. The UEs 200 are performing the uplink transmission from the first symbol to the second symbol in a subframe within the MCOT.

The eNB 100 associates three UEs 200 in a group, such that each UE 200 can hear the uplink transmission of other UEs 200 associated with the same group. The UE2 200 starts sensing the shared resource from the second symbol and can perform uplink transmission for the subsequent 13 symbols post performing a successful LBT procedure. Similarly, UE3 200 starts sensing the shared resource from the third symbol and can perform uplink transmission for the subsequent 12 symbols post performing a successful LBT procedure.

Figure 17A:
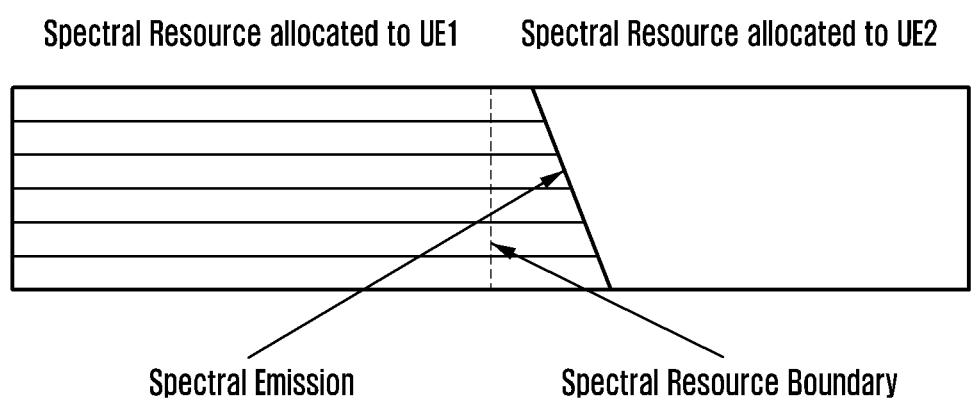
FIG. 17A illustrates spectral emission of spectral resource allocated to a first UE into spectral resource allocated to a second UE according to an embodiment of the present disclosure.
Figure 17B:
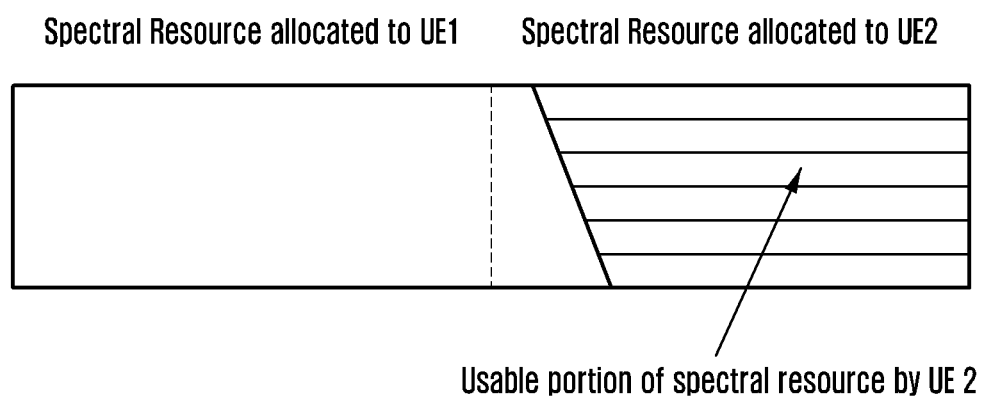
FIGS. 17B and 17C illustrates mechanisms to counter spectral emission according to various embodiments of the present disclosure.
Figure 17C:
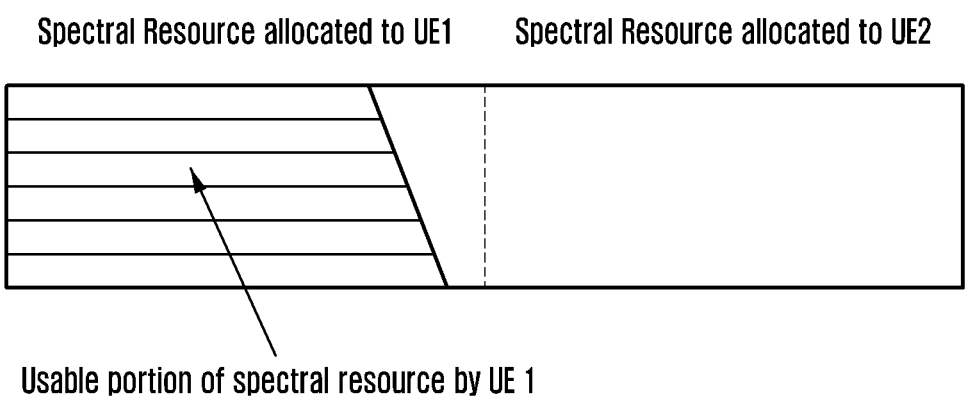

FIG. 17A illustrates spectral emission of spectral resource allocated to a first UE 200 into spectral resource allocated to a second UE 200 according to an embodiment of the present disclosure. Although only UE1 200 and UE2 200 are depicted in FIGS. 17A to 17C, it is to be noted that any number of UEs 200 may be allocated dedicated spectral resources by the eNB 100.

Referring to FIG. 17A, UE1 200, i.e., the first UE, and UE2 200, i.e., the second UE, are allocated dedicated spectral resources to perform uplink transmission. The spectral resources are a part of the LTE-U spectrum, and are allocated by the eNB 100. The spectral resource allocated to the UE1 200 and the spectral resource allocated to UE2 200, are adjacent. Due to the spectral emission of the spectral resource allocated to the UE1 200 on the spectral resource allocated to the UE2 200, the UE2 200 may sense that its spectral resource is not free. This occurs despite detecting an absence of interference from other nodes such as Wi-Fi, and the allocated spectral resources being disjoint. The occurrence of such false sensing can be categorized under the following scenarios:

a) UE1 200 completes its energy detection procedure prior to the UE2 200 and initiates performing uplink transmission. While the UE2 200 continues performing the energy detection procedure, the spectral emission from the spectral resource allocated to the UE1 200 due to the uplink transmissions from the UE1 200 may result in a failure of the energy detection performed by UE2 200.

b) UE1 200 and UE 2 200 are signaled by the eNB 100 to perform uplink transmissions in the dedicated spectral resources. The spectral emission occurs due to the UE1 200 and UE2 200 performing the respective LBT procedures independently, and hence choose different LBT mechanisms and thereby different contention window (CW) sizes.

If the UE1 200 chooses a smaller CW than UE2 200, then the UE1 200 can perform uplink transmissions prior to the UE2 200. In the above mentioned scenarios, the spectral emission due to the uplink transmissions of the UE1 200 into the spectral resources allocated to the UE2 200 causes energy detection failures for the UE2 200. Hence, the UE2 200 is forced to back off and wait for a longer duration prior to sensing/transmitting. Hence, the eNB 100 has to account for these scenarios and perform appropriate scheduling operations for multiple UE scheduling in the LTE-U spectrum.

FIGS. 17B and 17C illustrates mechanisms to counter spectral emission according to various embodiments of the present disclosure. In an embodiment, the eNB 100 skips one resource block/resource element (RB/RE) between the uplink transmissions of the UE1 200 and the UE2 200. Since the UEs 200 and the eNB 100 are all well calibrated and the emission masks can be known apriori, the eNB 100 evaluates the worst case spectral emission that can be caused by one UE 200 to the spectral resource allotted to other UEs 200. The eNB 100 allows avoiding a portion of the spectrum (in terms of RBs and REs) for performing uplink transmission, as depicted in FIGS. 17B to 17C. As depicted in FIG. 17B, the eNB 100 indicates the region of the spectrum to be avoided by the UE2 200 which is likely to be implicated by spectral emission due to uplink transmissions from the UE1 200, and allows the UE2 200 to perform sensing over a fragmented spectrum (spectral resource allocated to the UE2 200). Similarly, as depicted in FIG. 17C, the eNB 100 indicates the region of the spectrum to be avoided by the UE1 200 which is likely to be implicated by spectral emission due to uplink transmissions from the UE2 200, and allows the UE1 200 to perform sensing over a fragmented spectrum (spectral resource allocated to the UE1 200).

If spectral emission due to uplink transmission from one UE 200 into the spectral resource allocated to another UE 200 cannot be known, then the eNB 100 considers the worst case spectral emission scenario and avoids the part of the spectrum that is prone to be implicated by spectral emission from the uplink transmissions of UE1 (200), depicted FIG. 17B, and UE2 200, depicted in FIG. 17C, respectively.

In order to prevent spectral emission, the method further ensures that transmitted power of the first UE 200 and the second UE 200 is below a predefined threshold. The threshold, in LAA, used for sensing whether there is an ongoing uplink transmission in the LTE-U spectrum is −72 dBm. Hence, the method ensures that the transmitted power of each UE 200 is controlled such that spectral emission is minimized. In an example, if the transmitted power from the UE1 200 is below a predefined threshold, then in an event of spectral emission, the power sensed by the UE2 200 due to the transmission of UE1 200 would be less than −72 dBm. If the sensed power is less than or equal to −72 dBm, the UE2 200 concludes that the spectral resource allocated to it is free from any interference. Subsequently, the UE2 200 initiates uplink transmission.

Thus, the proposed method ensures that the spectral emission is not more than 72 dBm in order prevent other UEs 200 to falsely sense channel occupancy and refrain from accessing the spectrum allocated to them by the eNB 100. The method ensures that the power level of uplink transmission from each UE 200 is within the predefined threshold. However, the UEs 200 cannot always perform uplink transmission with a power level within the predefined threshold, particularly if the eventual transmission power level results in an erroneous decoding at the eNB 100.

Figure 18A:
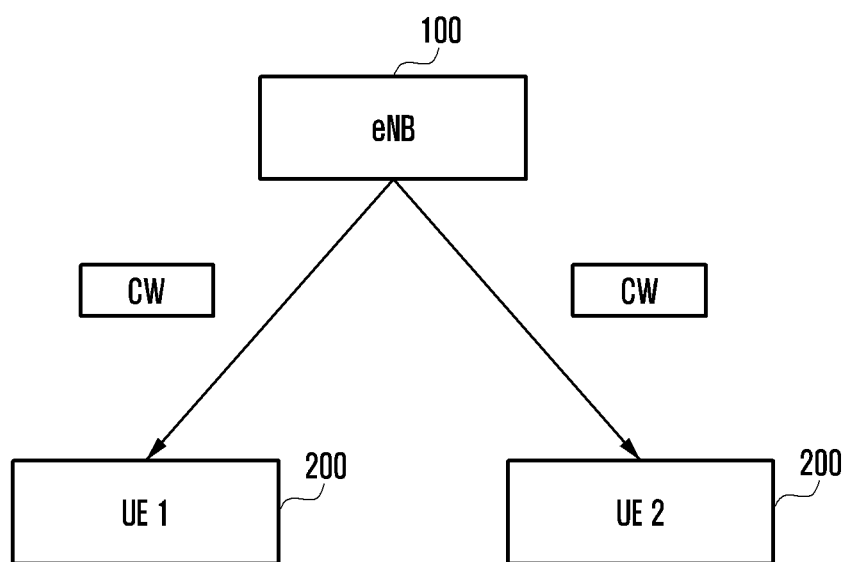
FIG. 18A illustrates assignment of same contention window (CW) to the first UE and a second UE by the eNB according to an embodiment of the present disclosure.

FIG. 18A illustrates assignment of same CW to the first UE 200 and the second UE 200 by the eNB 100 according to an embodiment of the present disclosure. Although only UE1 200 and UE2 200 are depicted in FIGS. 18A and 18B, it is to be noted that the eNB 100 can assign CW and monitor the uplink transmissions from any number of UEs 200.

When the eNB 100 allocates spectral resources for scheduling uplink transmissions from both UE1 200 and UE2 200 at the same time, the eNB 100 assigns the same CW to UEs 200 which are allocated spectral resources, adjacent to each other. Since the uplink transmissions from both UE1 200 and UE2 200 are synchronized in time, both UEs 200 perform the LBT procedure in the dedicated spectral resources. If the UEs 200 sense an absence of interference from Wi-Fi nodes, RATs, or the like, the LBT procedures performed by the UEs 200 are successful. Thereafter, the UE1 200 and UE2 200 simultaneously perform uplink transmission. Depending on the interference scenarios in each of the dedicated spectral resources, the eNB 100 determines whether the LBT procedures to be performed by the UEs 200 can be of same category. If the LBT procedures performed by the UEs 200 are not of the same category, then the eNB 100 assigns a constrained LBT procedure to be performed by both the UEs 200.

In an example, if it is sufficient to perform a LBT procedure for 25 μs by the UE1 200 based on the interference scenario, and the UE2 200 needs to perform a 'Category 4 LBT' procedure based on the interference scenario, then the eNB 100 ensures that the UE1 200 performs the 'Category 4' LBT procedure. This is to ensure that the LBT procedures performed by the UEs 200 complete at the same time, and the UEs 200 initiate performing uplink transmissions at the same time.

Figure 18B:
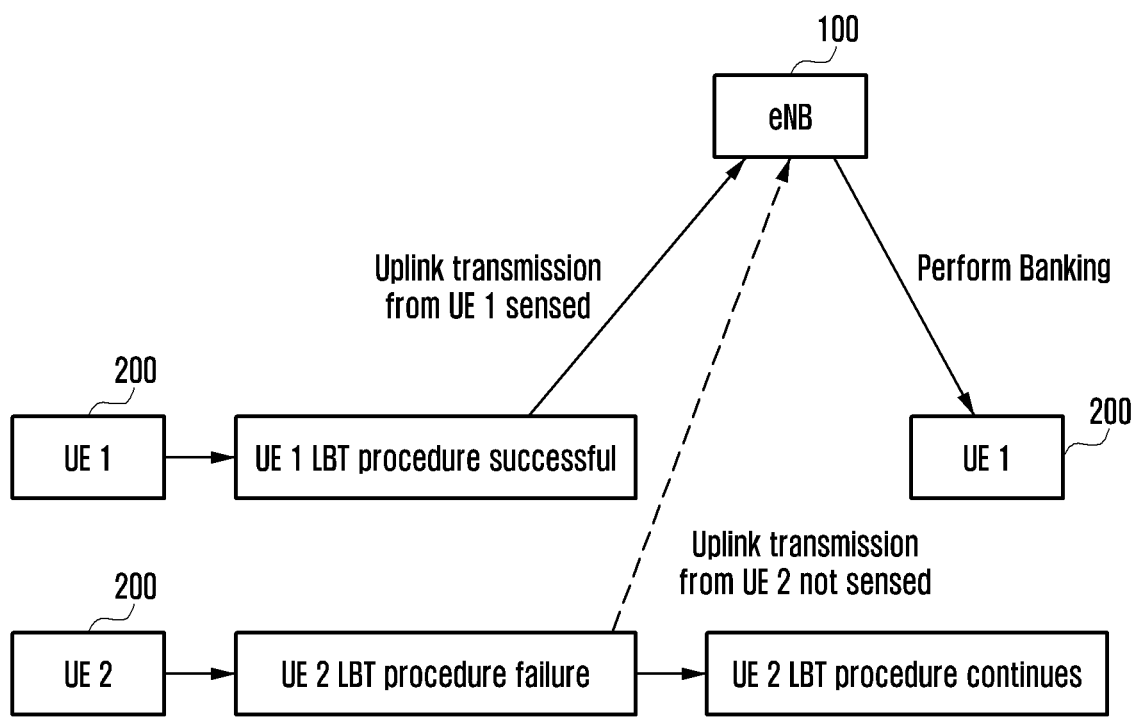
FIG. 18B illustrates monitoring simultaneous reception of uplink transmissions from the first UE and the second UE by the eNB according to an embodiment of the present disclosure.

FIG. 18B illustrates monitoring simultaneous reception of uplink transmissions from the first UE and the second UE, by the eNB according to an embodiment of the present disclosure.

Once the LBT procedures performed by the UE1 200 and the UE2 200 are completed post expiry of the CW period, each UE 200 can simultaneously perform uplink transmission and there will be no occurrence of spectral emission caused due to uplink transmission from one UE into the spectral resource allotted to the other UE. It is to be noted that initiation of simultaneous uplink transmission from both UEs 200, post expiry of the CW window, will occur only when the LBT procedure performed by the UE1 200 and the UE2 200 complete within the specified CW.

Considering a scenario, if a UE 200, among the UEs 200, determines that it is necessary to increase the size of the CW due to a failure in the LBT procedure, then additional mechanisms are necessary to ensure the occurrence of simultaneous uplink transmissions. Hence, in this scenario, the eNB 100 waits for a predefined period beyond the period required for completing the LBT procedure, performed by the UEs 200. Thereafter, the eNB 100 detects by sensing, if there is an occurrence of simultaneous uplink transmissions from both UEs 200. If the eNB 100 detects the occurrence of simultaneous uplink transmission, then the eNB concludes that the LBT procedure performed by the UEs 200 is successful. If the eNB 100 does not detect the occurrence of simultaneous uplink transmissions, then it transmits a signal to one of the UEs 200, for example UE1 200, to suspend its uplink transmission for a period until the LBT procedure performed by another UE, i.e., the UE2 200, succeeds. Apparently there is a delay in uplink transmission for the UE1 200, but it is tradeoff for preventing spectral emission.

It is to be noted that the embodiment discussed in FIG. 18A and FIG. 18B can be implemented independently. An additional embodiment can also be implemented which integrates the functionalities of the embodiments discussed in the FIG. 18A and FIG. 18B sequentially.

Figure 19:
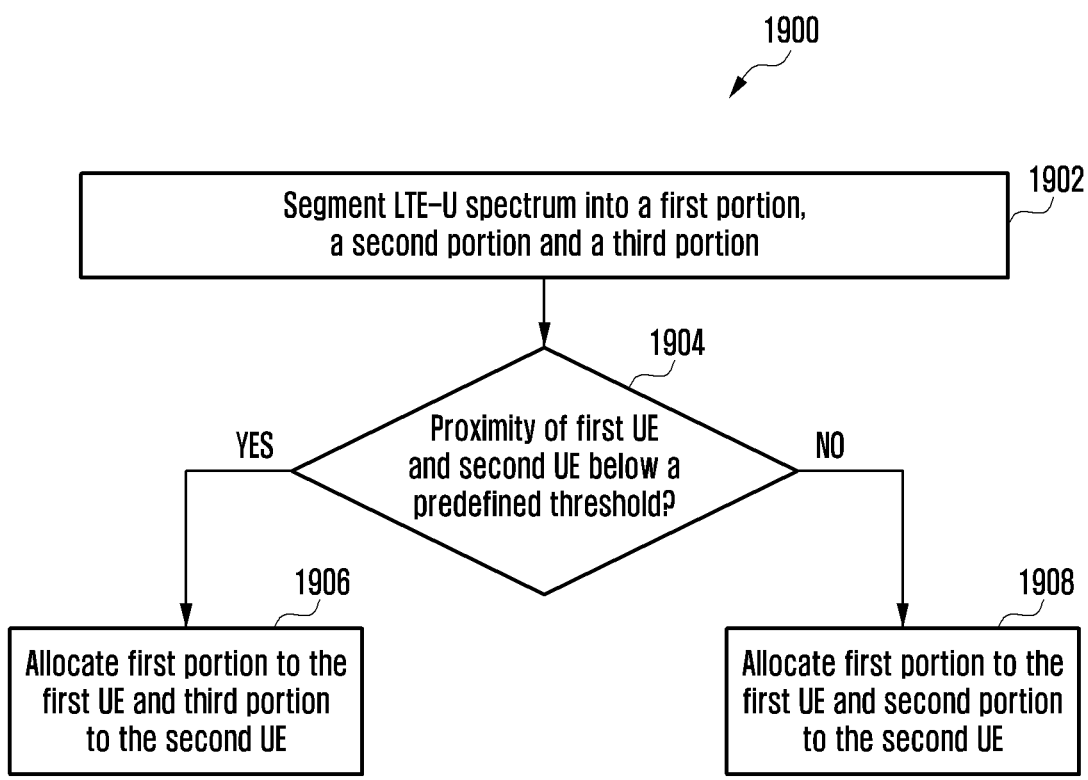
FIG. 19 is a flowchart depicting a method for allocating spectral resources to first UE and a second UE by the eNB based on proximity between the first UE and the second UE according to an embodiment of the present disclosure.

FIG. 19 is a flowchart 1900 depicting a method for allocating spectral resources to the first UE 200 and the second UE 200 by the eNB 100 based on proximity between the first UE 200 and the second UE 200 according to an embodiment of the present disclosure.

At operation 1902, the method includes segmenting the LTE-U spectrum into a first portion, a second portion and a third portion. It is to be noted that the LTE-U spectrum can be divided into many portions amongst many UEs 200. In an example, the method is considered with two UEs 200 in which the LTE-U spectrum is segmented into three parts.

At operation 1904, the method includes determining whether proximity of the first UE 200 and the second UE 200 is below a predefined threshold. At operation 1906, the method includes allocating the first portion for uplink transmission by the first UE 200 and the third portion for uplink transmission by the second UE 200, in response to determining that proximity of the first UE 200 and the second UE 200 is below the predefined threshold.

At operation 1908, the method includes allocating the first portion for uplink transmission by the first UE 200 and the second portion for uplink transmission by the second UE 200, in response to determining that proximity of the first UE 200 and the second UE 200 exceeds the predefined threshold. If the proximity of the first UE 200 and the second UE 200 exceeds the predefined threshold, then there is no possibility that the first UE 200 can hear the uplink transmissions of the second UE 200. As such, the scope of spectral emission is eliminated. Therefore, the eNB 100 needs to be aware of the locations of the first UE 200 and the second UE 200, in order to be able to allocate adjacent spectral resources to the first UE 200 and the second UE 200. The awareness of the locations of the first UE 200 and the second UE 200 also enables the eNB 100 to transmit signals, to the first UE 200 or the second UE 200, indicating one of the UEs 200 to suspend uplink transmissions.

The various actions, acts, blocks, operations, or the like in the flowchart 1900 may be performed in the order presented, in a different order or simultaneously. Further, in some embodiments, some of the actions, acts, blocks, operations, or the like may be omitted, added, modified, skipped, or the like without departing from the scope of the disclosure. The method and other description provide a basis for a control program, which can be easily implemented by a microcontroller, microprocessor, or a combination thereof.

Figure 20:
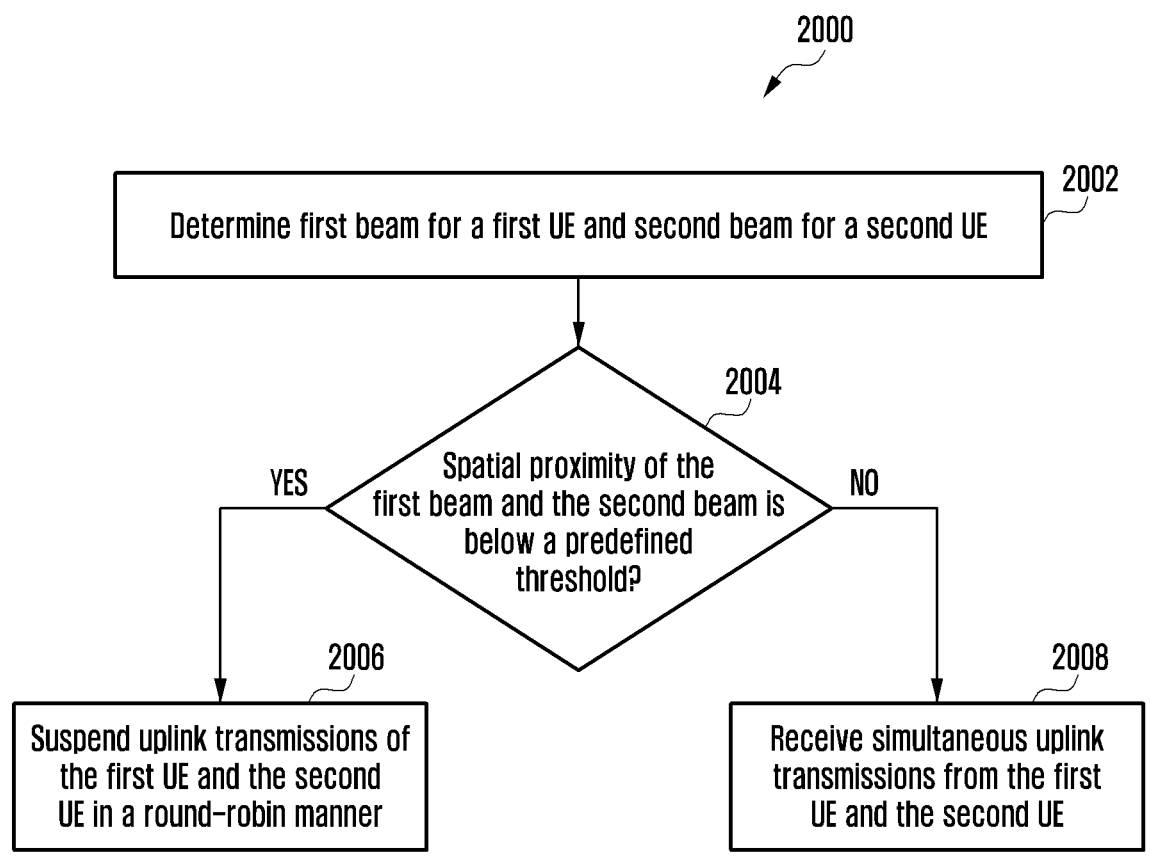
FIG. 20 is a flowchart depicting a method for allocating beams in a 5$^{th}$ generation (5G) system to the first UE and the second UE by the eNB, based on spatial proximity between the allocated beams according to an embodiment of the present disclosure.

FIG. 20 is a flowchart 200 depicting a method for allocating beams in a 5$^{th}$ generation (5G) system to the first UE 200 and the second UE 200 by the eNB 100 based on spatial proximity between the allocated beams according to an embodiment of the present disclosure.

5G systems that are deployed in spectrum band, less than 6 GHz, are likely to follow similar LBT protocols as defined in eLAA systems. Hence the issue of spectral emission across adjacent spectral resources is relevant in 5G systems. The spectral emission across adjacent spectral resources, i.e., across adjacent spectrum bands of operation, can occur across adjacent beams that are used by the eNB 100 to communicate with UEs 200 in a beamforming-based 5G system for spectrum band operations, greater than 6 GHz. The embodiments discussed in FIGS. 17B and 17C, FIGS. 18A and 18B, and FIG. 19, as described earlier for eLAA, can be extended to 5G systems. The spectral resources in these discussed embodiments are replaced with beams. An overall solution is discussed in FIG. 20.

At operation 2002, the method includes determining a first beam and a second beam, among a plurality of beams, for uplink transmission by a first UE 200, and a second UE 200 respectively. At operation 2004, the method includes determining whether spatial proximity of the first beam and the second beam is below a predefined threshold. At operation 2006, the method includes suspending uplink transmissions from the first UE 200 and the second UE 200, in response to determining that the spatial proximity of the first beam and the second beam is below the predefined threshold. At operation 2008, the method includes receiving simultaneous uplink transmissions from the first UE 200 and the second UE 200, in response to determining that the spatial proximity of the first beam and the second beam exceeds the predefined threshold.

If the spatial proximity between the first beam and the second beam exceeds the predefined, then uplink transmissions are not suspended. The eNB 100 can indicate whether to initiate or suspend uplink transmissions through the beams by transmitting signals in PUSCH frames. The eNB 100 can signal the UEs 200 about suspending uplink transmissions, checking power levels, CW, or the like, either using radio resource control (RRC) signaling or using PDCCH signaling (downlink control information (DCI)), in which the eNB 100 indicates the grants allotted to the UEs 200 for performing uplink PUSCH transmissions. For 5G systems, depending on the deployment considerations, MAC control element based signaling is performed.

The various actions, acts, blocks, operations, or the like in the flowchart 2000 may be performed in the order presented, in a different order or simultaneously. Further, in some embodiments, some of the actions, acts, blocks, operations, or the like may be omitted, added, modified, skipped, or the like without departing from the scope of the disclosure. The method and other description provide a basis for a control program, which can be easily implemented by a microcontroller, microprocessor, or a combination thereof.

The embodiments disclosed herein can be implemented through at least one software program running on at least one hardware device and performing network management functions to control the elements. The elements shown in the FIGS. 1 through 20 include blocks which can be at least one of a hardware device, or a combination of hardware device and software module.

While the present disclosure has been shown and described with reference to various embodiments thereof, bit will be understood that by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:

receiving, from a base station, downlink control information (DCI) scheduling a physical uplink shared channel (PUSCH) transmission, the DCI including first information on a channel access type and second information on a number of scheduled subframes;

performing, in a first subframe, a first channel access procedure based on the channel access type;

performing, in a second subframe which is subsequent to the first subframe among the scheduled subframes, a second channel access procedure based on the channel access type, in case that the first channel access procedure fails; and transmitting, to the base station, an uplink data on a PUSCH based on the second channel access procedure.

2. The method of claim 1,
wherein the DCI further includes third information on a channel access priority, and
wherein the number of the scheduled subframes is less than or equal to a duration corresponding to the channel access priority.

3. The method of claim 2, wherein the duration includes an uplink maximum channel occupancy time (MCOT).

4. The method of claim 1,
wherein the DCI further includes fourth information on a timing offset for the PUSCH transmission and fifth information on a PUSCH starting position,
wherein the uplink data is transmitted on the PUSCH from a symbol in a subframe, and
wherein the subframe is identified based on the fourth information and the symbol is identified based on the fifth information.

5. The method of claim 1,
wherein the channel access type is one of a first type or a second type,
wherein a channel access procedure of the first type is performed based on a contention window, and
wherein, a channel access procedure of the second type is performed based on a duration of 25 µs.

6. A method performed by a base station in a wireless communication system, the method comprising:
transmitting, to a terminal, downlink control information (DCI) scheduling a physical uplink shared channel (PUSCH) transmission, the DCI including first information on a channel access type and second information on a number of scheduled subframes; and
receiving, from the terminal, an uplink data on a PUSCH,
wherein a first channel access procedure is performed, in a first subframe, based on the channel access type, and
wherein a second channel access procedure is performed, in a second subframe which is subsequent to the first subframe among the scheduled subframes, based on the channel access type, in case that the first channel access procedure fails.

7. The method of claim 6,
wherein the DCI further includes third information on a channel access priority, and
wherein the number of the scheduled subframes is less than or equal to a duration corresponding to the channel access priority.

8. The method of claim 7, wherein the duration includes an uplink maximum channel occupancy time (MCOT).

9. The method of claim 6,
wherein the DCI further includes fourth information on a timing offset for the PUSCH transmission and fifth information on a PUSCH starting position,
wherein the uplink data is received on the PUSCH from a symbol in a subframe, and
wherein the subframe is identified based on the fourth information and the symbol is identified based on the fifth information.

10. The method of claim 6,
wherein the channel access type is one of a first type or a second type,
wherein a channel access procedure of the first type is performed based on a contention window, and
wherein, a channel access procedure of the second type is performed based on a duration of 25 µs.

11. A terminal in a wireless communication system, the terminal comprising:
a transceiver configured to transmit or receive a signal; and
a controller coupled with the transceiver and configured to:
receive, from a base station, downlink control information (DCI) scheduling a physical uplink shared channel (PUSCH) transmission, the DCI including first information on a channel access type and second information on a number of scheduled subframes,
perform, in a first subframe, a first channel access procedure based on the channel access type,
perform, in a second subframe which is subsequent to the first subframe among the scheduled subframes, a second channel access procedure based on the channel access type, in case that the first channel access procedure fails, and
transmit, to the base station, an uplink data on a PUSCH based on the second channel access procedure.

12. The terminal of claim 11,
wherein the DCI further includes third information on a channel access priority, and
wherein the number of the scheduled subframes is less than or equal to a duration corresponding to the channel access priority.

13. The terminal of claim 12, wherein the duration includes an uplink maximum channel occupancy time (MCOT).

14. The terminal of claim 11,
wherein the DCI further includes fourth information on a timing offset for the PUSCH transmission and fifth information on a PUSCH starting position,
wherein the uplink data is transmitted on the PUSCH from a symbol in a subframe, and
wherein the subframe is identified based on the fourth information and the symbol is identified based on the fifth information.

15. The terminal of claim 11,
wherein the channel access type is one of a first type or a second type,
wherein a channel access procedure of the first type is performed based on a contention window, and
wherein, a channel access procedure of the second type is performed based on a duration of 25 µs.

16. A base station in a wireless communication system, the base station comprising:
a transceiver configured to transmit or receive a signal; and
a controller coupled with the transceiver and configured to:
transmit, to a terminal, downlink control information (DCI) scheduling a physical uplink shared channel (PUSCH) transmission, the DCI including first information on a channel access type and second information on a number of scheduled subframes,
receive, from the terminal, an uplink data on a PUSCH,
wherein a first channel access procedure is performed, in a first subframe, based on the channel access type, and wherein a second channel access procedure is performed, in a second subframe which is subsequent to the first subframe among the scheduled subframes, based on the channel access type, in case that the first channel access procedure fails.

17. The base station of claim 16, wherein the DCI further includes third information on a channel access priority, and wherein the number of the scheduled subframes is less than or equal to a duration corresponding to the channel access priority.

18. The base station of claim 17, wherein the duration includes an uplink maximum channel occupancy time (MCOT).

19. The base station of claim 16, wherein the DCI further includes fourth information on a timing offset for the PUSCH transmission and fifth information on a PUSCH starting position, wherein the uplink data is received on the PUSCH from a symbol in a subframe, and wherein the subframe is identified based on the fourth information and the symbol is identified based on the fifth information.

20. The base station of claim 16, wherein the channel access type is one of a first type or a second type, wherein a channel access procedure of the first type is performed based on a contention window, and wherein, a channel access procedure of the second type is performed based on a duration of 25 μs.

* * * * *